US006513019B2

(12) United States Patent
Lewis

(10) Patent No.: US 6,513,019 B2
(45) Date of Patent: *Jan. 28, 2003

(54) FINANCIAL CONSOLIDATION AND COMMUNICATION PLATFORM

(75) Inventor: Charles J. Lewis, Quogue, NY (US)

(73) Assignee: Financial Technologies International, Inc., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 19 days.

(21) Appl. No.: 09/250,752

(22) Filed: Feb. 16, 1999

(65) Prior Publication Data

US 2002/0065752 A1 May 30, 2002

(51) Int. Cl.[7] .............................................. G06F 17/00
(52) U.S. Cl. ........................................... 705/35; 705/38
(58) Field of Search ............................. 705/38, 39, 35, 705/36, 42; 707/10; 709/250, 226

(56) References Cited

U.S. PATENT DOCUMENTS

| 4,346,442 A | | 8/1982 | Musmanno | |
| 4,376,978 A | | 3/1983 | Musmanno | |
| 4,597,046 A | | 6/1986 | Musmanno et al. | |
| 4,674,044 A | | 6/1987 | Kalmus et al. | |
| 4,700,297 A | | 10/1987 | Hagel, Sr. et al. | |
| 4,774,663 A | | 9/1988 | Musmanno et al. | |
| 4,926,325 A | * | 5/1990 | Benton et al. | 705/39 |
| 4,953,085 A | | 8/1990 | Atkins | |
| 5,126,936 A | | 6/1992 | Champion et al. | |
| 5,182,770 A | | 1/1993 | Medveczky et al. | |
| 5,206,803 A | | 4/1993 | Vitagliano et al. | |
| 5,235,507 A | | 8/1993 | Sackler et al. | |
| 5,270,922 A | | 12/1993 | Higgins | |
| 5,297,032 A | | 3/1994 | Trojan et al. | |
| 5,490,243 A | | 2/1996 | Millman et al. | |
| 5,671,363 A | | 9/1997 | Cristofich et al. | |
| 5,765,144 A | | 6/1998 | Larche et al. | |
| 5,774,880 A | | 6/1998 | Ginsberg | |
| 5,781,654 A | | 7/1998 | Carney | |
| 5,806,049 A | | 9/1998 | Petruzzi | |
| 5,826,243 A | | 10/1998 | Musmanno et al. | |
| 5,875,435 A | * | 2/1999 | Brown | 705/30 |
| 5,890,141 A | | 3/1999 | Carney et al. | |
| 5,905,974 A | | 5/1999 | Fraser et al. | |
| 5,937,402 A | * | 8/1999 | Pandit | 71207/4 |

(List continued on next page.)

FOREIGN PATENT DOCUMENTS

JP 408077273 A * 3/1996

OTHER PUBLICATIONS

PR Nweswire Association, Inc, Compuserve Offers Portfolio Management Through the Pawns Financial;Mar. 26, 1996.*
Vermette, Charles E., "FTI Makes a Transition, Company Develops Software for Processing and Accounting of Securities", New York Software Newspaper, Feb. 1998.*
Product Brochure for The Box Universal Financial Sever, from Financial Technologies International.*
Collection of promotional material relating to ancillary products such as The Box, dated in 1997–98.

*Primary Examiner*—James P. Trammell
*Assistant Examiner*—Pierre E Elisca
(74) *Attorney, Agent, or Firm*—Morgan, Lewis & Bockius, LLP

(57) ABSTRACT

An integrated financial data reporting system provides for real time data entry, assessment, and report generation. The system includes message formatting, database management, and select applications for preparing sophisticated financial presentations in essentially real time. Financial institutions through the system rationalize risk, performance, and compliance positions in a cost-efficient manner.

1 Claim, 32 Drawing Sheets

U.S. PATENT DOCUMENTS

| | | | | |
|---|---|---|---|---|
| 5,940,809 A | * | 8/1999 | Musmanno et al. | 705/35 |
| 5,963,922 A | * | 10/1999 | Helmering | 705/35 |
| 6,014,640 A | * | 1/2000 | Bent | 705/30 |
| 6,023,684 A | * | 2/2000 | Pearson | 705/35 |
| 6,029,147 A | * | 2/2000 | Horadan et al. | 705/35 |
| 6,049,783 A | * | 4/2000 | Segal et al. | 705/37 |
| 6,070,152 A | * | 5/2000 | Carey et al. | 705/35 |
| 6,092,121 A | * | 7/2000 | Bennett et al. | 709/250 |

\* cited by examiner

TRIAL BALANCE

REPORT DATE: 29-DEC-1999   REPORTING CURRENCY: USD

| CURRENCY | ENTITY | ACCT. | NAME | LDGR ID | LEDGER NAME | OPNG BAL. | DEBIT ACTIVITY | CREDIT ACTIVITY | CLOSING BALANCE | REPORTING CURRENCY |
|---|---|---|---|---|---|---|---|---|---|---|
| JAPANESE YEN | ABC CAPITAL MARKET | 043-99999 | INVENTORY 2 - ABC CAPITAL MARKETS | 9000 | INVENTORY | 0 | 120,000 | <120,000> | 0 | 0 |
| | | 802-11111 | ABC CAP MKT INTER-CO WITH ABC INC | 9005 | INTER-CO. | 0 | 120,000 | 0 | 120,000 | 1,000 |
| | | 875-87959 | FAIL- ABC CAPITAL MARKETS | 9008 | FAIL | 0 | 0 | <120,000> | <120,000> | <1,000> |
| | ABC INCORP- ORATED | 101-24680 | SUE LIN INCORPORATED | 9001 | DAC CUST. | 0 | 120,000 | 0 | 120,000 | 1,000 |
| | | 801-22222 | ABC INC INTER-CO WITH ABC CAP MARKET | 9005 | INTER-CO. | 0 | 0 | <120,000> | <120,000> | <1,000> |
| TOTALS | | | | | | 0 | 360,000 | <360,000> | 0 | 0 |
| US DOLLARS | ABC CAPITAL MARKET | 043-99999 | INVENTORY 2 - ABC CAPITAL MARKETS | 9000 | INVENTORY | 0 | 1,000 | <2,000> | <1,000> | <1,000> |
| | | 875-87959 | FAIL- ABC CAPITAL MARKETS | 9008 | FAIL | 0 | 1,000 | 0 | 1,000 | 1,000 |
| TOTALS | | | | | | 0 | 2,000 | <2,000> | 0 | 0 |
| REPORTING CURRENCY TOTAL | | | | | | | | | | 0 |

FIG. 27

AVAILABLE COLLATERAL PROJECTIONS

AS OF 16:00:00     AS OF DATE: 24-AUG.-2000

| ISSUE TYPE | ISSUE NAME | ID | RTG | PRICE | MGN RATE | LOCATION | POSITION | ENCUMBERED POSITIONS | ANTICIPATED SETTLEMENTS | AVAILABLE COLLATERAL | MARKET VALUE | MARGIN VALUE |
|---|---|---|---|---|---|---|---|---|---|---|---|---|
| BOND | RADAMCO N.V. YANKEE NOTES 7.750% | 774849AB9 | Aa | 98.50 | 102 | DTC | 40,000,000 | 0 | -70,000,000 | -30,000,000 | | |
| | RALSTON PURINA DEBENTURES 9.30% | 751277AN4 | A- | 102.00 | 102 | EUROCLR | 75,000,000 | 0 | 0 | 75,000,000 | 73,875,00.00 | 72,426,470.00 |
| | RECOGNITION EQUIP INC. CONCERTIBLE SUB. | 756231ACO | B+ | 102.00 | 102 | DTC | 33,000,000 | 0 | 0 | 33,000,000 | 33,660,000.00 | 33,000,000.00 |
| | REED ELSEVER CAPITAL INC. NOTES 7% | 75820QAB8 | AA- | 101.00 | 105 | DTC | 77,000,000 | 0 | -40,000,000 | 37,000,000 | 37,740,000.00 | 37,000,000.00 |
| | | | | | | | | | | 105,000,000 | 106,050,000.00 | 103,970,588.24 |
| | | | | | | EUROCLR | 65,000,000 | 0 | 40,000,000 | | | |
| GOVT | US TREASURY BOND COUPON 8.75% 11-15-2008 | 912810CE6 | | 101.00 | 105 | CHASE | 26,000,000 | 0 | 13,000,000 | 39,000,000 | 39,390,000.00 | 38,617,647.06 |
| | US TREASURY INFLATION INDEXED NOTE | 9128273A8 | | 100.00 | 105 | CHASE | 93,000,000 | 20,000,000 | -29,000,000 | 44,000,000 | 44,440,000.00 | 42,323,809.52 |
| | US TREASURY NOTE COUPON 7.75% 12-31-99 | 912827S45 | | 99.00 | 105 | CHASE | 116,000,000 | 0 | 2,000,000 | 118,000,000 | 118,000,000.00 | 112,380,952.38 |
| | US TREASURY NOTE COUPON 8.5% 11-15-2000 | 912810EF1 | | 102.00 | 103 | CHASE | 145,000,000 | 0 | 5,000,000 | 150,000,000 | 148,500,000.00 | 141,428,571.43 |
| MONEY MKT | | | | | | | 24,000,000 | 0 | 11,000,000 | 35,000,000 | 35,700,000.00 | 34,000,000.00 |
| | BANKERS TRUST 0% CPN 7-7-2000 | 066320AL6 | Aa | 101.00 | 103 | DTC | 46,000,000 | 0 | -19,000,000 | 27,000,000 | 27,270,000.00 | 26,475,728.10 |
| | HOUSEHOLD FIN. CORP. BE 1 AP 93 SEMI-PAY | 44181JGL5 | A | 100.00 | 103 | DTC | 118,000,000 | 0 | 0 | 118,000,000 | 118,000,000.00 | 114,563,106.60 |
| | LASALLE NORTHWEST ZERO % 7-3-2000 | 518027SQ1 | | 101.50 | 103 | DTC | 28,000,000 | 0 | -14,000,000 | 14,000,000 | 14,210,000.00 | 13,796,116.50 |
| | MERRILL LYNCH & CO 6TH MONTH LIBOR | 59018SRH9 | AA- | 98.00 | 103 | DTC | 85,000,000 | 0 | 0 | 85,000,000 | 83,300,000.00 | 80,873,786.41 |

FIG. 28

DATA BASE CONNECTION INFORMATION

MAXIMUM:

MINIMUM:

DB SOURCE:

MINIMUM SESSIONS PER CONNECTION:

MAXIMUM SESSIONS PER CONNECTION:

CONNECTION REFRESH INTERVAL:

SESSION REFRESH INTERVAL:

SUBMIT

FIG. 29

FINANCIAL CONSOLIDATION AND COMMUNICATION PLATFORM

FIELD OF THE INVENTION

The present invention is generally directed to data processing systems for financial management. More particularly, the present invention is directed to a data processing system that provides substantial throughput for real time standardization, aggregations derivation, consolidation, integration, structuring, storage and distribution of financial data of a broad scope that is obtained from multi-formatted disparate sources.

BACKGROUND OF THE INVENTION

For at least the last twenty years, the financial industry has been at the leading edge in bringing to practical application new computer systems that manage and support sophisticated transactions and recordkeeping. This aggressive effort is not surprising. The financial industry includes banks, brokerage firms, and investment managers that consider as fundamental to the success of their business, the timely, accurate, and complete processing of transactions associated with the capital and assets of both clients that are both institutional and individual in nature, and of the firms themselves. These transactions include the trading of numerous and diverse forms of financial instruments such as equities (company shares-both common and preferred) warrants, bonds, options, commodities, loans, repurchase agreements, and a full collection of complex fixed income (i.e., bonds) and sophisticated derivative products, denominated in multiple currencies. Due to the increasingly complex nature of these financial instruments, and as the result of mergers and acquisitions, multiple disparate systems are used. Each system is used for one, or a specific subset of, financial products, lines of business, legal entities, currencies, or locations. This specialization has also caused fragmentation, making it difficult for customers and firms to assess their total financial position in time to control risks and respond to opportunities, resulting in the occasional downfall of leading financial institutions, sometimes in spectacular fashion (see FIG. 1). It also makes it difficult to keep regulatory, legal, management, and compliance information consistent and mandates the commitment of substantial resources for correcting the inconsistencies.

Definitions

As used in this document:

Standardization is the process of conforming disparate values for the same data field into the same standard value, or standardizing a set of fields that describe a business object into a standard set. Examples: standardizing the currency code for Deutsche Marks to "DEM" wherever it is used; standardizing the set of fields that fully record a securities purchase transaction; and standardizing the format for transmitting the standard set of fields that describe a customer or counterparty.

Information means values and objects that are created by derivation, aggregation, consolidation, or integration or otherwise acting upon detailed data ("data").

Derivation is the process of deriving information from a collection of data. For example, when a stock or bond is sold, the currency gain/loss and market gain/loss is derived from a collection of data that include cost basis in local currency, sales proceeds in local currency, currency exchange rate, and taxable or base equivalent currency(ies) for the owner(s) of the Account.

Aggregation is the process of accumulating a net balance from a series of transactions over a period of time. For example aggregating the net currency gain/loss and net market gain/loss for a series of gains and losses that resulted from a series of sell transactions for a customer' or trader's account since a given date (account opening, start of the year, start of the quarter, etc.).

Consolidation is the process of 1) grouping Accounts for access and aggregation by criteria such as customer, counterparty, trader, investment manager, book, desk, legal entity, location, and the like; 2) creating a composite of market data that pertains to each financial instrument from data that originates from multiple sources (e.g. identifiers, prices, indicative data, and corporate action announcements for the same financial instrument are received from separate sources and are consolidated into a composite); and 3) creating a composite of data pertaining to the same customer or counterparty that originates from multiple sources (e.g., identifiers, addresses, settlement instructions, credit authorizations, buying preferences, access authorizations, etc. for the same customer or counterparty are received from separate sources and are consolidated into a composite).

Structuring is the process of organizing data, and information that is derived from the data, into interrelated, normalized structures that resolve redundancies and anomalies. This includes the addition of unique values that are used to create "primary-foreign key" relationships that interrelate pairs of data tables.

Integration is the process of interrelating and information across disciplines. For example, interrelating a Position (i.e., a Quantity and Cost of a Financial Instrument) with the indicative and price information about the Financial Instrument in which the Position is held; and also interrelating the Position with the descriptive information (e.g., processing instructions, address) about the Customer that owns the Position, the Account in which the Position is held, the Counterparty that is the custodian for the Position, and the Counterparty (e.g. dealer) that is responsible for delivering the Position (when pending settlement) to the custodian. Integration also means that messages are sent among components of the system to produce an integrated result. For example, when the Market Data Information Server receives a corporate action notification, it creates an entitlement message that instructs the Accounting Information Server by what amount to adjust Positions and/or Cash Receivable, and also sends a message to the Alert Notification Server to send a notification to the Customers or Counterparties that are entitled to the proceeds of the corporate action.

Storage is the process of recording data and information in a relational-object database. This includes the addition of physical keys, indexes, and the like that support rapid and flexible access to the data and information.

Distribution is extracting data and information from a database and sending it to one or more application systems or user desktop computers. This process often also consists of denormalizing and translating the data and information into a format and value set that is most easily processed by the receiving application or user desktop (i.e., web server application that presents data to a browser-based user desktop).

Risk-exposure, inventory, liquidity, and the like-is dynamically altered with each transaction. Numerous functions within the firm have substantial interest in seeing these details-and quickly. For example, firms are particularly concerned with knowing the availability and location of all collateral that can be used to raise funds quickly in the event of a liquidity shortage, and on the most favorable terms. The risk manager also seeks the firm's, or a counterparty's, total position and cash versus each counterparty and currency, integrated with current and complete details (i.e., "market data") of each financial instrument that is traded in customer portfolios or in the firm's inventory, to input into automated risk assessments. Based on the resulting information, the risk manager acts to rebalance positions of the firm or the customer so that its exposure may be reduced. The sooner the inputs can be gathered, standardized, aggregated, and consolidated, the sooner the risk assessment can be performed and corrective action can be taken.

Other examples include the high profile governmental regulations that apply to many, if not most, financial institutions. Specifically, essentially every firm includes dedicated resources to insure regulatory compliance, sometimes with entire departments focused on this task. Firm profitability, general ledger, and financial statement activities also involve time sensitive assessment and refinement of account activities and transactions. And, of course, perhaps the most critical is the reporting to and maintaining good client communications-including rapid reporting of trades and the like, and proactively alerting the customer, investment manager, trader and all other interested parties when a transaction or market change has created a situation that requires immediate attention or response.

These examples are merely illustrative of the ongoing need by almost every customer and functional group within the firm for current and projected transaction, position, balance, and market information that is continuously consolidated by customer, counterparty, currency, financial instrument, and other criteria. To accomplish this for a large and growing audience of simultaneous users requires that the information must be standardized; edited and enriched; aggregated and consolidated; integrated and structured; and stored into and distributed from; a widely accessible and sharable, and individually useful database that is continuously updated on a real-time, or near real-time basis.

FIG. 2 provides a functional block diagram depicting sources of financial data and consumers of financial data and information. Many functional groups within the firm, and virtually all classes of customers, need access to both data and information.

Recognizing the importance of getting data and information to key functions within and external to the firm, various techniques have been developed. These techniques are graphically depicted in FIG. 3—which is a rough characterization of data flows and information creation within an organization. In this depiction, three different types of financial instruments are transacted, block 10, as recorded in transaction data records 20 being aggregated on reports 30 within each of three separate regions (e.g., Tokyo) 40. For each type of financial instrument (e.g., equities, fixed income, options), in each region, a similar path will exist, but the timing of the processing, and the information created on the reports will be substantially different. A similar set of disparate flows occur in each region for market data records that contain changes to attributes describing available fixed income instruments (e.g., rating, interest rate) and, separately, market data records that contain changes to attributes describing available equities (e.g., price, dividend declaration), for example.

Finally, similar sets of disparate flows occur in each region for data records that contain changes to attributes (e.g., addresses, settlement instructions, credit rating). Pertaining to various types of customers (e.g., retail brokerage, corporate lending, insurance, mutual fund) and counterparties (broker/dealers, investment managers).

Three key attributes are indicated in this representation. First, data travels and is transformed into reports along parallel paths, but in essentially isolated fashion. This is typically a 24-hour cycle, at best, and often occurs only weekly by batch processing accumulated transactions during the period of interest. Second, information is distributed in the form of reports, with the entire report mailed or transmitted to all recipients. As a result, consolidating accounts, positions, and cash for a customer or the firm (or any subdivision thereof), block 50, can only occur once every 24 hours or even once per week, can require substantial manual or off-line sub-processes to extract and manipulate data and information that is only available in the reports, and even then often produces outputs that have significant errors and omissions. Thirdly, if the information that is desired at block 50 is not contained in or cannot be derived from the set of reports produced at block 40, the user must do its financial management in absence of the needed information, and request that a new report be programmed, or a modification be made to an existing report, either of which can be a time-consuming and expensive process.

While the above representation depicts three data flows, the actual number of such data flows can number into the 100's, makings the costs of obtaining timely consolidated information prohibitive. Even for those with substantial resources, it often takes years to get the data sorting and distribution properly structured. Even then, the traditional approach depicted in FIG. 3 often does not provide enough information, soon enough to prevent otherwise preventable financial losses. Simply stated, traditional techniques are inadequate. What is needed is a current, integrated, accurate and comprehensive information management system providing consolidated transaction, position, balance, market data, and customer/counterparty data ("consolidated information") to customers, employees, and counterparties of the firm within a tightly controlled time period—ideally in real-time.

It was with this understanding of the difficulties remaining in financial information management that formed the impetus for the present invention.

OBJECTS AND SUMMARY OF THE PRESENT INVENTION

It is, therefore, an object of the present invention to provide a data processing system and platform that provides an integrated, real-time data and information consolidation and distribution solution for financial institutions.

It is another object of the present invention to provide a computer system that receives incoming stochastic data records from plural disparate systems and data sources relating to financial transactions, financial instruments, customers, counterparties, employees, organizational units, and financial institutions; converts this disparate data into a common format; and derives information from the data; consolidates and integrates the data and information on a database that is defined according to a comprehensive financial industry data model; distributes the data and information electronically and automatically publishes the data and information to subscribers; and provides access to this data and information for real-time inquiry by various functional areas and customers of a financial services enterprise.

It is yet another object of the present invention to provide a system that consolidates both the incoming data, and the information that the system derives from such incoming data, in a well-defined database that supports multi-report generation in essentially real-time by a wide range of users making use of a wide range of programming languages and higher-level information reporting tools.

It is still another object of the present invention to provide a scalable active message driven distributed network architecture that operates on several different commercially available computer hardware, operating system, and database management system platforms.

It is another object of the present invention to provide a management information system that continuously posts transactions to positions, lots and cash balances, maintains one or more cost bases for each position and lot in both trade currency and multiple base currency equivalents, calculates currency and market gain/loss and profit/loss, aggregates and nets payables and receivables, performs amortization and accretion, accrues income, calculates position valuations, and maintains position, cash and valuation history, buying power, and margin maintenance amounts—by customer, fund, product, trader, investment manager, counterparty, legal entity, desk, subdivision, location, and the like.

It is still another object of the present invention to provide a generated, object-oriented computer system (e.g., a set of generated instantiations of C++ and/or Java object classes) that updates a database that is structured according to a data model that relates data and information pertaining to financial transactions (settled and forecast), financial instruments, customers, counterparties, employees, organizational units, and financial institutions, and that simplifies roll-up and drill-down between hierarchical levels of aggregated information and the lowest level of data details, as well as simplifies access to user-defined, recursive groupings of data and information.

It is yet another object of the present invention to provide a library of business objects that provide easy access to the database according to business subjects such as "Account", "Customer", "Position", "Stock", "Bond", "Derivative", "Counterparty", "Transaction", and the like, regardless of how the collection of data and information that pertains to each business subject may be physically arranged and structured on the database (including the core database, as well as the time series index, search index, reporting images, and the like.)

It is yet another object of the present invention to provide a computer platform that permits access through a unified, Internet-enabled, lightweight, scalable, user interface that supports browser-based inquires, updates, and reporting and requires minimal code to be installed and maintained on each user's personal computer or other personal access device.

It is yet another object of the present invention to proactively alert users and other applications when a situation occurs that warrants immediate attention. For example, alert the appropriate users and applications that as the result of a transaction, market change, or customer/counterparty change, a financial threshold or limit has been breached.

It is yet another object of the present invention to provide client workstations that include thin client access to a remote database employing technologies such as HTML, DHTML, Java, and other Web-enabled user interface technologies.

It is yet another object of the present invention to provide a message-driven, object-oriented, generated component architecture that both processes and publishes messages that conform to popular message standards (e.g., FIX, ISITC, S.W.I.F.T., OFX, ISO, and the like) by using the Extensible Markup Language (XML) and that achieves high scalability via multi-processing and parallel processing on Unix, NT, and mainframe computing configurations.

It is still another object of the present invention to provide a workstation that allows users to enter and modify business rules that are recorded in database tables and that designate the specific information that is to be derived from each type of incoming transaction, market data record, or customer/counterparty update record; thus allowing more and different information to be created and stored in the database without requiring revision to the production code. The workstation has a graphical user interface which requires minimal formal programming training or experience to use effectively. These business rules permit dynamic instruction of server-based components that contain multi-currency, multi-product, and multi-entity bookkeeping logic; market data cleansing, consolidation and distribution logic; and user/customer/counterparty data collection logic. By manipulating the business rules, the user can tailored the processing performed by, and the information created and stored by the system, as desired by different customer or user segments.

It is still another object of the present invention to provide a utility that automatically transforms the business rules from entries in data tables into executable objects that perform such tailored business functions at high speeds.

The above and other objects of the present invention are realized in an integrated set of object-oriented (e.g., C++, Java, and the like) software components that are configured as a distributed processing network and as such constitute a computer system that receives input records that contain the data elements that comprise or describe financial transactions (settled and pending), financial instruments, customers, counterparties, employees, organizational units, and financial institutions, derives information from such data elements by coordinating its aggregation, calculation, and consolidation, interrelates the data and information when storing it in a database that is designed for organizing, storing, and retrieving such data and information, and proactively distributes the data and information according to pre-defined instructions (e.g., alert users that a transaction has caused a negative cash balance to occur that is below a pre-defined minimum amount, and alert users again if the cash shortage has not been covered within a pre-defined time allowance). The database structure and update functions are such that the incoming data is processed and combined with the previously stored data and information to form a continuous, real-time integration of critical customer, market, and firm information. The database may be accessed simultaneously by numerous different financial firm employees, customers, counterparties, and analytical software applications via a variety of network connections (e.g., Internet, intranet, LAN, WAN, private network, and the like). Trade and settlement transactions are processed providing consolidated current and projected balances and positions across customers, accounts, books, funds, traders, investment managers, counterparties, settlement and business locations, legal entities, and the like.

The invention includes plural servers, each of which is called upon to perform functionality relevant to a particular input message, inquiry or report request, alert situation, or other subset of financial data processing. As shown in FIG. 4, these servers include: an Interface Transformation Server that maps and reformats incoming messages into a system-compliant format; a Message Bus component which transports the message to a Controller component that distributes workload (input messages) to the appropriate information server; an Accounting Information Server for processing messages that contain transactions and deriving positions, lots, and balances on a trade date and settlement date accrual accounting basis; a Market Data Information Server that processes messages that contain data records from multiple disparate market data sources and derives a composite of each financial instrument (of virtually any type); a Customer/Counterparty Information Server that processes messages that contain data records from multiple disparate sources that describe, and record standing processing instructions for, customers and counterparties and derives a composite of each customer, counterparty, and financial institution; a Calculation Server that performs financial calculations such as valuations, gain/loss, and the like; an Alert Notification Server that alerts users when a financial threshold, such as a credit or trading limit, has been crossed; a Data Distribution Server that proactively and electronically publishes data and information to users and other programs; a Web Server that manages database updates and retrievals from/to browser-based or other "thin client" access devices; a Search Engine that enables expedient free-form searches against the data and information in the database; a Reporting Engine that produces reports in volume and electronically routes the reports to the appropriate recipients; and a Time Series Engine that enables expedient date-and-time searches against the data and information in the database. Multiple instances of any server can be added dynamically to increase processing throughput.

Because incoming data records have multiple, disparate formats, select middleware interprets each incoming data record (i.e., message) and transforms it into the record format (i.e., message format) that is recognized and processed by the appropriate information server.

The foregoing features of the present invention are better understood by review of an illustrative embodiment thereof as described here in conjunction with the following diagrams:

BRIEF DESCRIPTION OF THE FIGURES

FIG. 21 is a screen display for market data entry, a browser-based user interface;

FIG. 22 is a screen display for categorizing and entering instructions for customer accounts, another browser-based user interface;

FIG. 26 is a screen display for transaction entry, another browser-based user interface;

FIGS. 27 and 28 are example reports produced by the Reporting Server.

FIGS. 29 and 30 are screen display for the System Administration application and the System Development Kit, respectfully.

DETAILED DESCRIPTION OF THE PREFERRED EMBODIMENT

The present invention is directed to an integrated computer system that consolidates data, derives information from this data, structures the data and information in a database that enables near real time information access, and distributes the data and information to users and software applications. Incoming data messages are read, parsed, and conformed to a standard structure. Three fundamental categories of messages are recognized, messages containing: financial transactions, market data updates, and customer/counterparty data updates. As the incoming data messages arrive, either in individual real-time messages or batch files of messages, they are converted into a format that is recognized by the information server that will process it. After processing by the appropriate information server, the data is placed into a highly structured database, where it updates information that was derived from previously processed messages. The database makes both the data and the information available for simultaneous access by—and proactive electronic distribution to—the numerous customers, employees, and counterparties of the organization according to select and individualized inquiry and publish criteria. Importantly, the system is designed so that inputs can be received from a myriad of different transaction origination and settlement systems, market data vendor systems, and customer/counterparty systems, each having its own disparate data record formats.

The database is accessible through a web-enabled (e.g., HTML, DHTML, or Java®) user interface, in addition to Windows® based inquiry, reporting, analytical, and application development tools.

The data model is an overlay on a commercial available relational and object database management system, such as Oracles®, Sybase®, Informix®, SQLServer®, DB2 or UDB.

The Accounting Information Server processes incoming messages that contain transaction data and post results in financial terms (cash, fees, shares, interests, and the like). Thus, these incoming transactions are aggregated and netted in real time to specific ledger entries. The aggregation and netting is performed by the Accounting Information Server according to business rules that instruct the Accounting Information Server how to apply the incoming transactions to account balances, exposures, and other second order assessments (i.e., information). The business rules, like the business rules that similarly instruct the market data information server and the customer/counterparty information server, reside in easily edited database tables or in objects that have been generated from such tables, thus allowing changes to the information content without disturbing the underlying information server code.

The system architecture permits simultaneous interoperation with other vendor software products and proprietary software applications, spanning simple query tools to sophisticated financial analytical applications.

Figure 1:
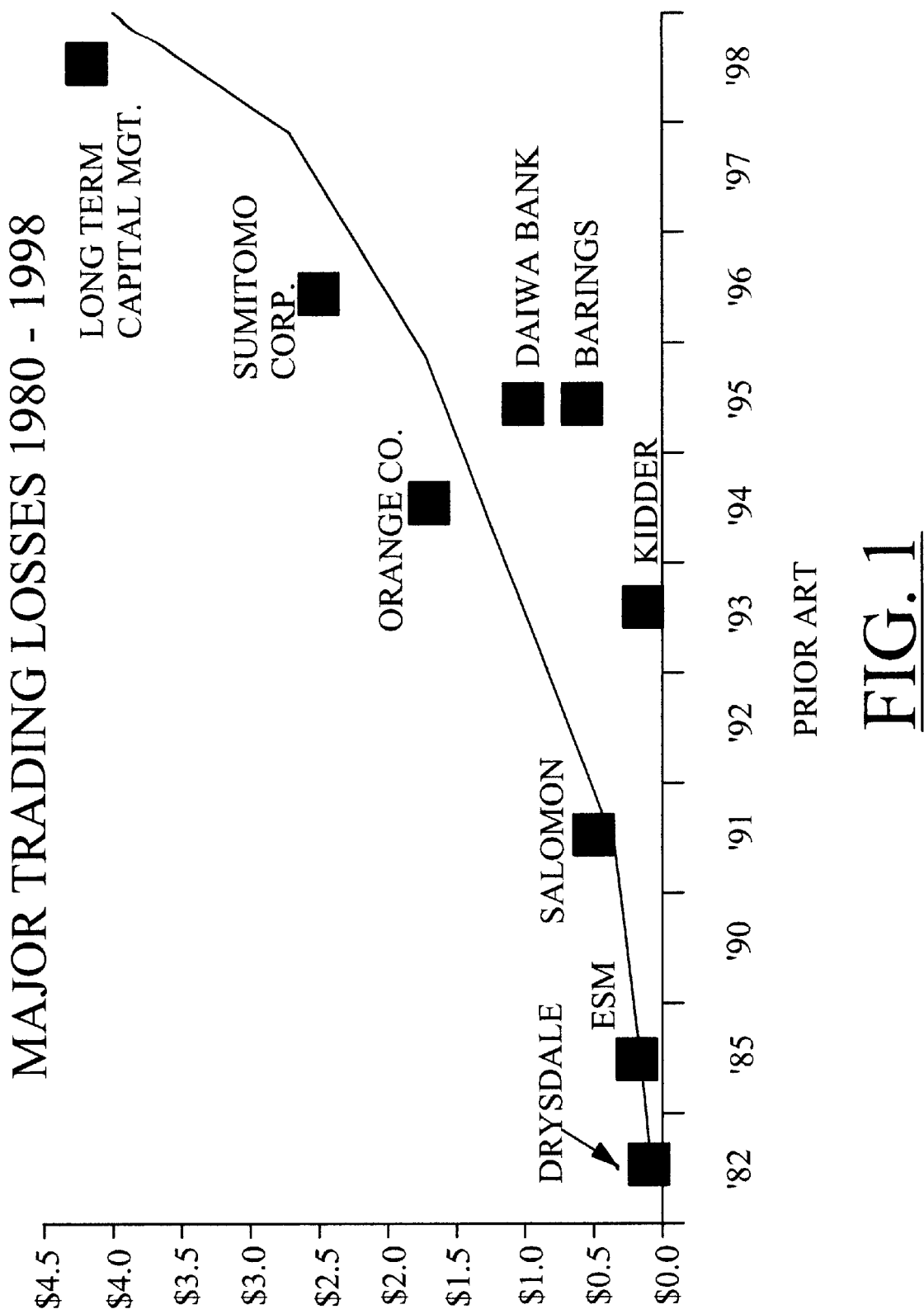
FIG. 1 depicts well-known financial institutions that have failed or encountered significant setbacks due to exposures from trading activities (Source: The Tower Group).
Figure 2:
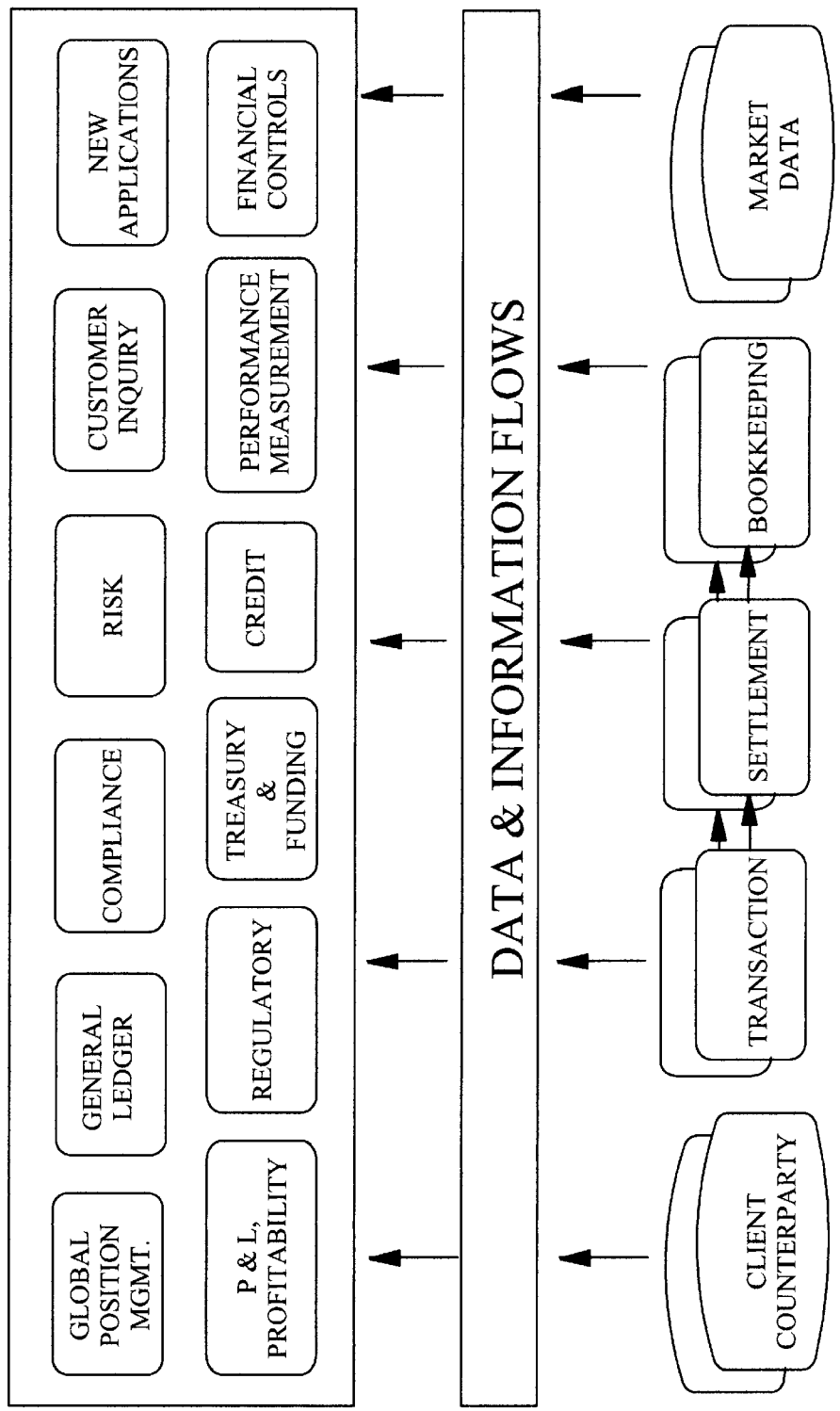
FIG. 2 depicts the various groups and analytical software applications within a financial firm that are typical consumers of the data and information on the invention's database.
Figure 3:
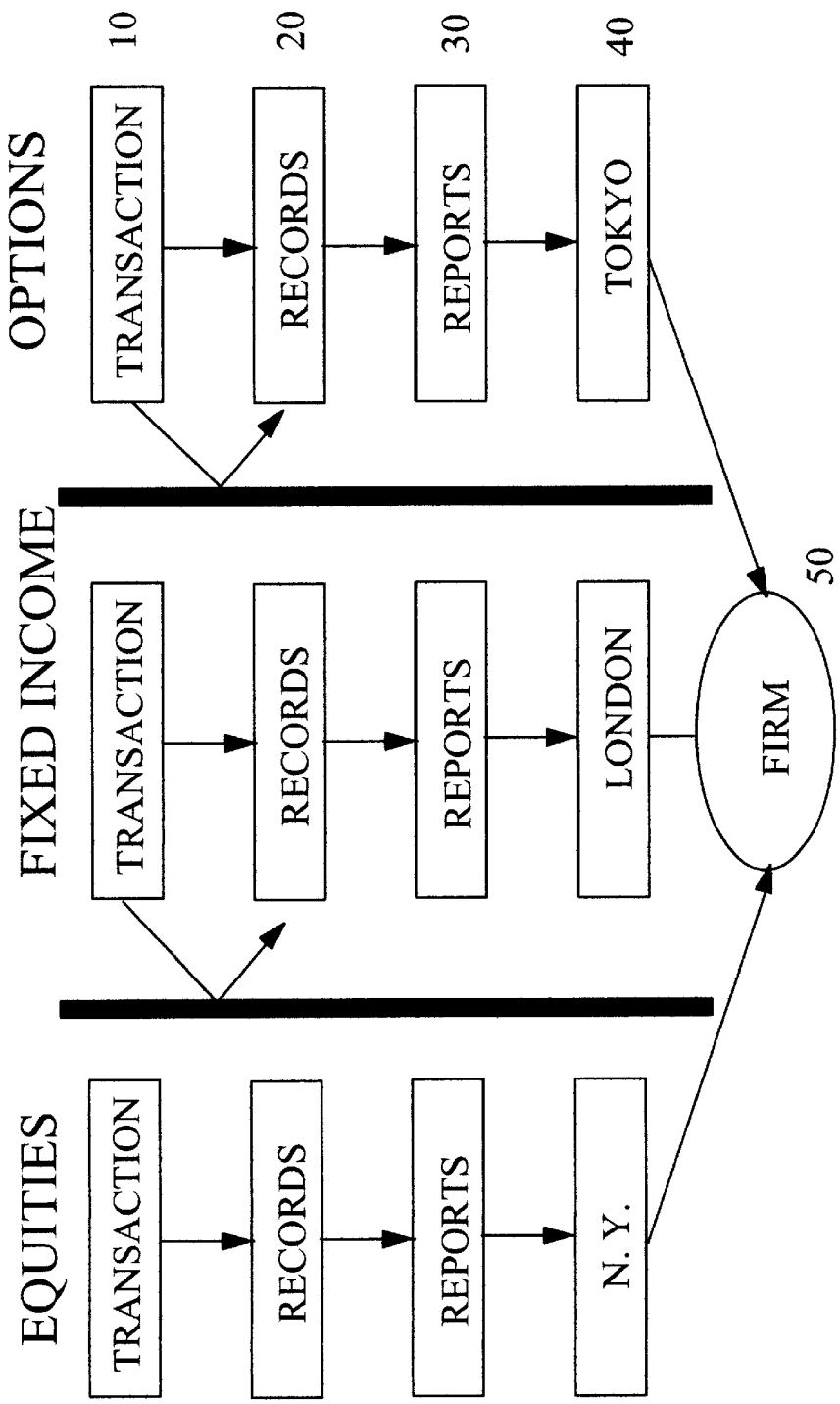
FIG. 3 depicts processing paths typical of conventional financial support systems.
Figure 4:
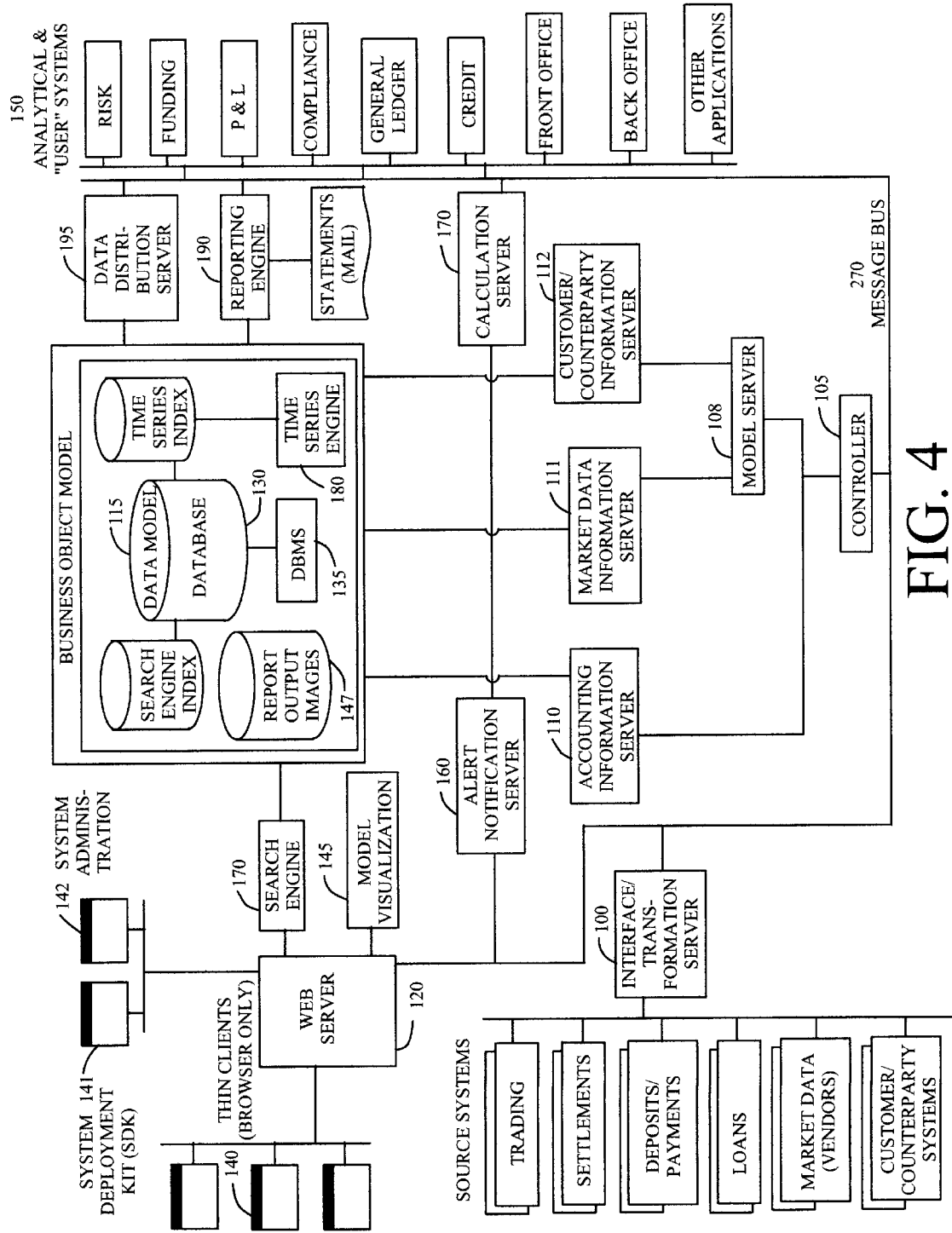
FIG. 4 depicts the component architecture of the present invention.

With the foregoing overview in mind, attention is first directed to functional block diagram, presented in FIG. 4. Input data are presented to the system from numerous external sources, via an object-oriented API, or application program interface. The API uses the Extended Markup Language (XML) and recognizes messages that conform to industry standard formats (including FIX, ISITC, OFX, S.W.I.F.T., ISO, and the like) as well as proprietary formats. At block 100, FIG. 4 the system provides an Interface Transformation Server that maps and reformats incoming messages to a system compliant format, by employing both the facilities of the Interface Transformation Server itself and/or more third party middleware products such as IBM's MQ Integrator product. Once in this format, the message is processed by one or more servers in the system.

The servers, listed above, and shown on FIG. 4, operate on NT, UNIX (e.g., Sun Solaris, HP/UX), or IBM mainframe platforms, or a combination thereof. Each server both processes and sends messages. As such, each server is invoked either by a message that is sent to it from another server, or by a direct call from another server or access device (e.g., a desktop). Messages are passed among servers via Message Bus, 270.

Once placed on the Message Bus, messages may be retrieved by any number of servers, including proprietary and 3$^{rd}$ party application servers, 150, that the user organization attaches to the Message Bus, 270. In this way, an expandable network of interoperating components is established. Each component "listens" for messages that have been placed upon the Message Bus and selects from the Message Bus those messages are of interest to the listening component and that have been specifically addressed to the listening component The Message Bus can be technologies such as IBM's MQ Series, TIB Rendezvous, TCP/IP, DCE, Named Pipes, and/or other such technologies. Plural Message Buses can be deployed simultaneously.

The principal group of components that update the database are the information servers, 105. Messages are taken off the Message Bus, 270, by the Controller, 105, and are edited, validated, and routed to the information server that processes that specific message. The information server processes the message, applying the appropriate business rules for that message, and then places both the input and results into the relational-object database, 130, in accordance with a highly structured data model, 115. The database is managed by a commercially available relational-object database management system, 135, such as Oracle®, Sybase®, Informix®, SQLServer®, DB2 or UDB. The business rules define how the contents of the message will alter the previously existing data and information on the database.

Continuing in FIG. 4, the system also employs a Web Server, 120, on an NT or UNIX platform. This Web Server operates in conjunction with plural Web clients, 140. These clients, 140, are designated as "thin clients" because they need only include browser presentation logic (e.g., the ability to present HTML, DHTML pages or Java applets). Accordingly, logic that is required to retrieve and manipulate data and information prior to its presentation on the user's browser, is accomplished on the Web server. The Web Server includes a persistent cache of complex objects, connection management, load balancing, and other such features and facilitates to enable high throughput and the easy addition of application functionality to the Web server.

Figure 5:
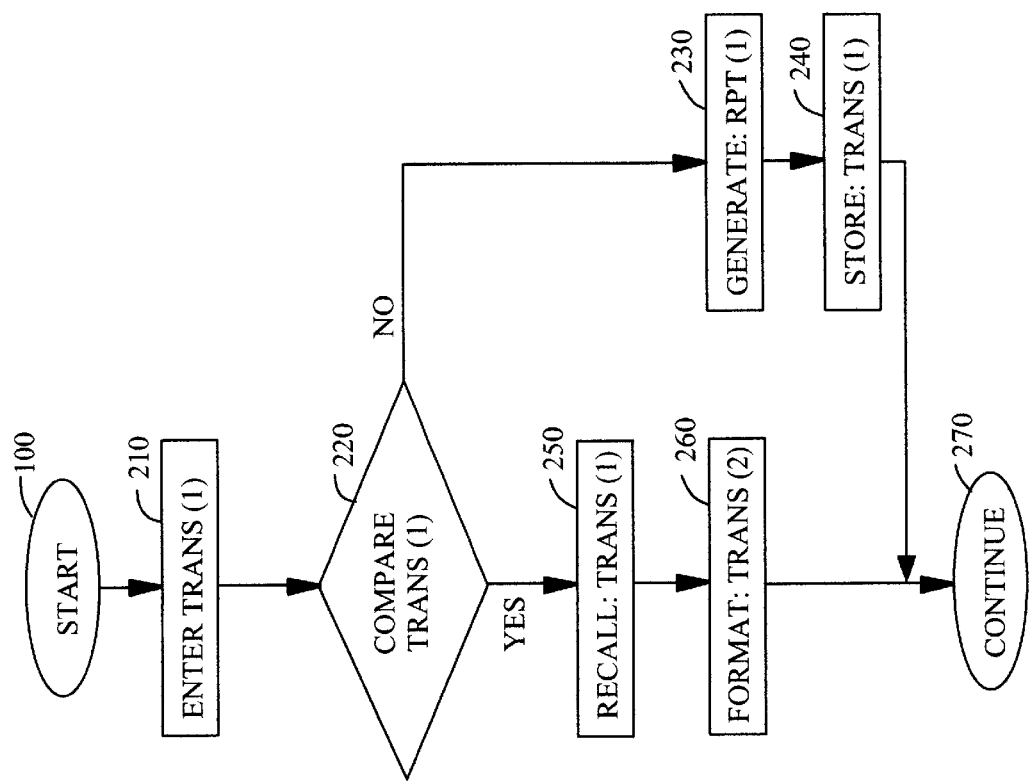
FIG. 5 provides a first logic diagram for the inventive system.

Now turning to FIG. 5, the control logic for the Interface Transformation Server, block 100 of FIG. 4 for transaction input, is presented. Operation conceptually starts for each transaction at Start, block 100, with entry at block 210. At Test 220, the system compares the incoming message, Tran(1) to the table of stored transaction types. If no match occurs, logic branches to block 230 and a rejection report RPT(1) is generated. The unclassified transaction is then stored, block 240, as a rejected entry.

Assuming a match, at Test 220, the system recalls the transformation matrix, block 250, and reformats the transaction into a message conforming to a standard definition, block 260, in accord with its transaction type. The properly formatted message is then passed to the Message Bus, 270, and the system prepares for receipt of the next inputted transaction, block 100.

While depicted as a sequential process, multiple transactions typically enter the system concurrently, and are standardized and placed on the Message Bus in parallel fashion in real-time. Once properly formatted, the incoming message is ready to be processed by the Controller, 105.

Figure 6:
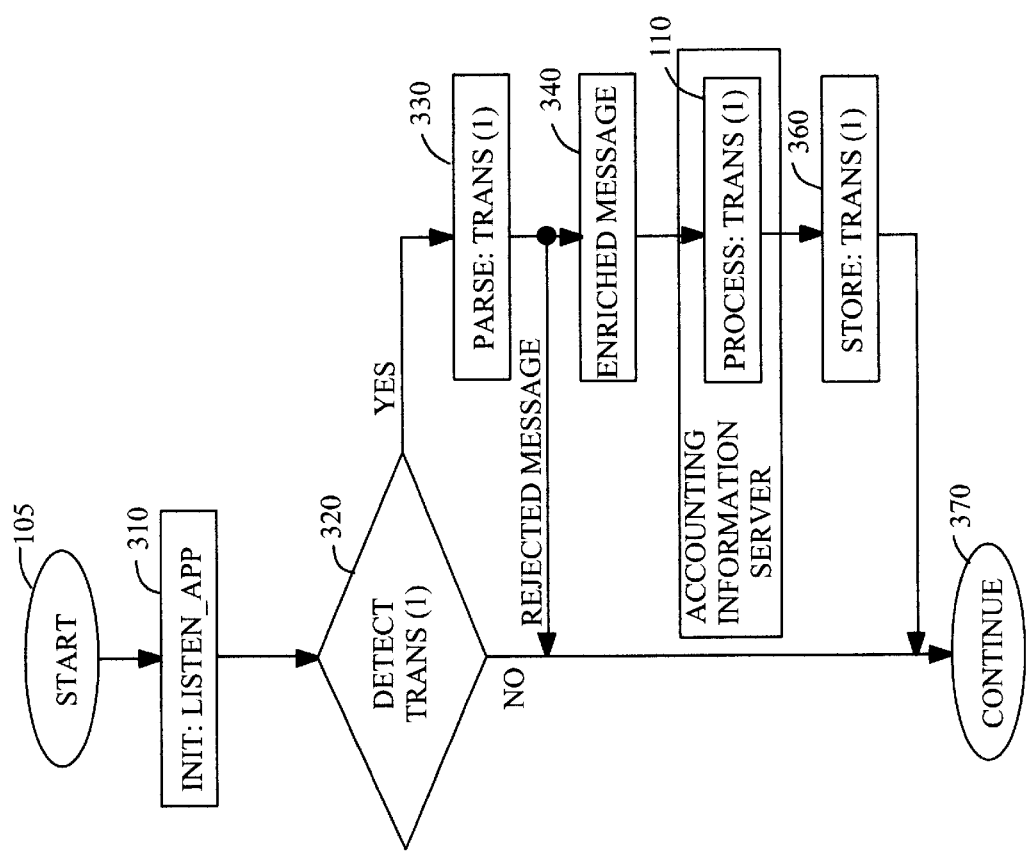
FIG. 6 provides a second logic diagram for the inventive system.

This process is depicted in FIG. 6. The Controller, 105, listens on the Message Bus, Test 320 for any messages of a type that is processed by one or more of the information servers, e.g., a message that contains data pertaining to a financial transaction, a market data update, or a customer/counterparty update. A positive response to this test branches logic to block 330, and the incoming message is parsed, edited, and validated. The Controller calculates or fills in missing data, and standardizes data values, by invoking objects designed for this purpose. If the resulting data message ("enriched message") is still insufficient for further processing, the message is rejected, 340, and is either electronically returned to the Message Bus, addressed to its sender, or is put into a database table for subsequent review and potential manual enrichment and re-submission to the Controller at a later time.

The enriched message is then passed to the appropriate information server, 110, 111, or 112 FIG. 4, which then derives information from the data in the message by applying functionality to the message, as instructed by the then current business rules, and updates the appropriate database tables. For messages destined for the Market Data Information Server, 111, or destined for the Customer/Counterparty Information Server, 112, the messages may first be "filtered" by the Model Server, 108 FIG. 4. The Model Server reduces the list of data items to be processed to only those data items pertinent to the specific type of market instrument or customer which is represented by the data in the message. For example, stocks, bonds, loans, mutual funds, and derivatives have both common and unique data items. Similarly, retail, institutional, brokerage, trust, banking, capital markets, etc. customers and counterparties have both common and unique data items. The Model Server filters out data items that are carried in the generic market data or customer/counterparty message, but that are unnecessary for processing specific instances of these messages, prior to passing the message to the appropriate information server.

Note that the system is capable of processing transactions effective on previous or future dates, and in such case uses the business rules that were, or will be, effective on such date. For the Accounting Information Server, for example, these rules will govern the processing of data contained in transaction messages and the updating of the tables that represent customer/firm accounts, ledgers, positions, balances, journal entries, transactions, transaction status, and the like.

The original input message, the enriched message, and the information that was derived by the information server when processing the enriched message (e.g., new position or balance) are placed into the database simultaneously to insure database integrity (a.k.a. the database is updated in "one unit of work") at block 360. The Controller, 105, then returns to listening mode, seeking the next message, block 370.

Please note that while depicted sequentially for illustration, the foregoing processing, like that provided earlier, is effected simultaneously-multiple messages are processed and multiple database updates are made in a nearly concurrent manner. Also note that plural instances of the same information server can co-exist in order to increase overall system throughput.

The database is configured to contain the data and information needed to support the full spectrum of financial services provided by financial services firms, e.g., brokers and dealers, banks and trusts, insurance companies, investment management and mutual fund companies, custodians and depositories, and the like, around the world:

Database: Content

Figure 7:
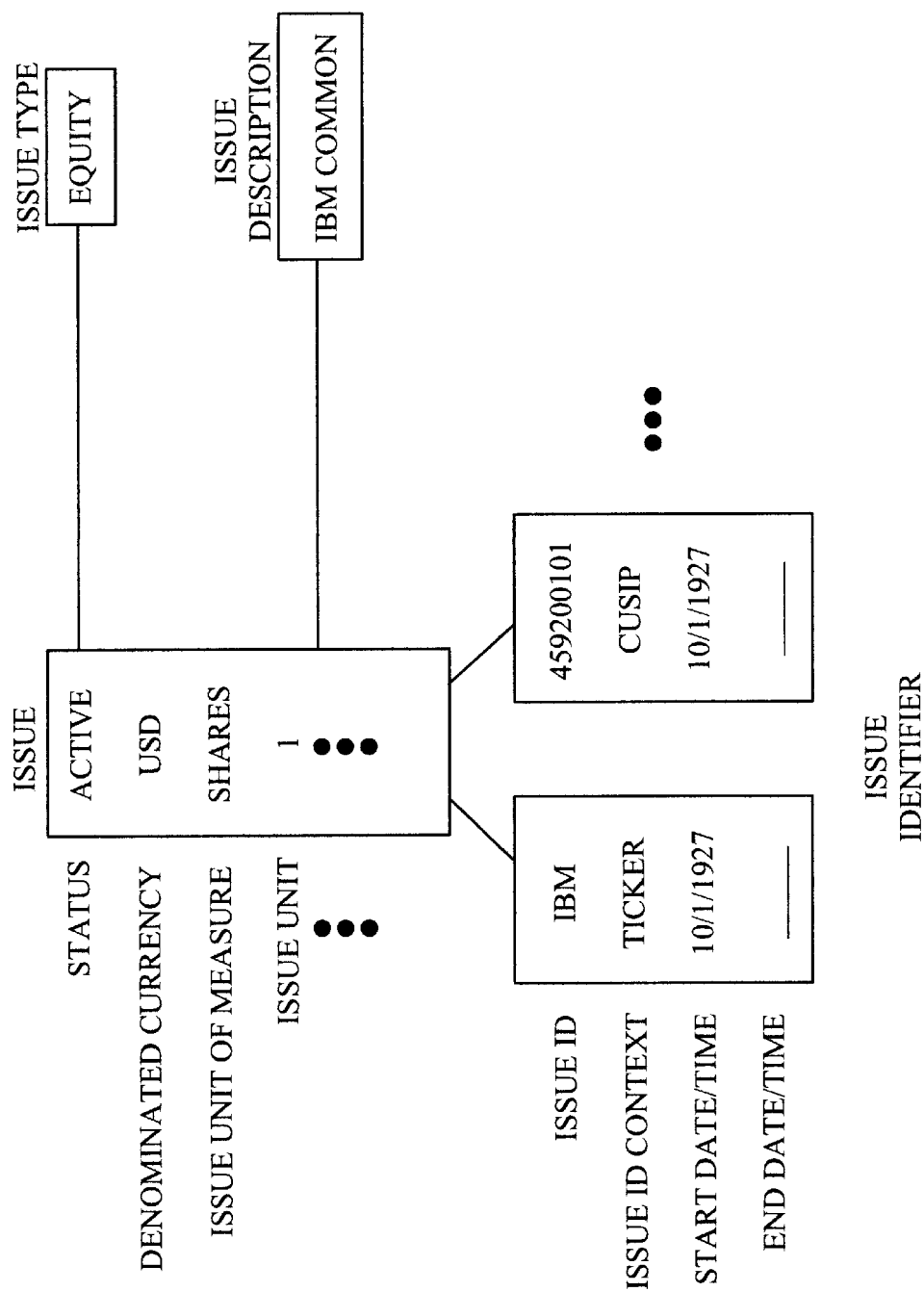
FIG. 7 depicts data relationships supported by the invention's data model.

1. Global Market Data
2. Positions, Balances, Lots, and Transactions
3. Financial Institutions and Locations
4. Customers, Counterparties, and Accounts
5. Employees and Organizational Structure
6. Product Lines and Services The system contains many business object classes ("business objects"), i.e., groups of interrelated database tables that pertain to a business subject, combined with functional objects and methods for processing the data and information stored in such tables. FIG. 7 exemplifies database tables that are associated with business objects for processing market data. This Figure shows how the database stores data that describes three characteristics of a common stock issue: (1) issue type (equity), (2) issue description (IBM Common), and (3) two forms of issue identifier (e.g., ticker and CUSIP number). Each rectangle depicts the data stored in one occurrence of a database table. Each arrow depicts one occurrence of a relationship between two tables (a.k.a. "primary-foreign key relationship") that the database maintains in order to facilitate navigation from table-to-table and maintain referential integrity among interrelated tables. Thus, a single stock will be represented by multiple table occurrences, entries logically associated by physical keys embedded within the database.

Figure 8:
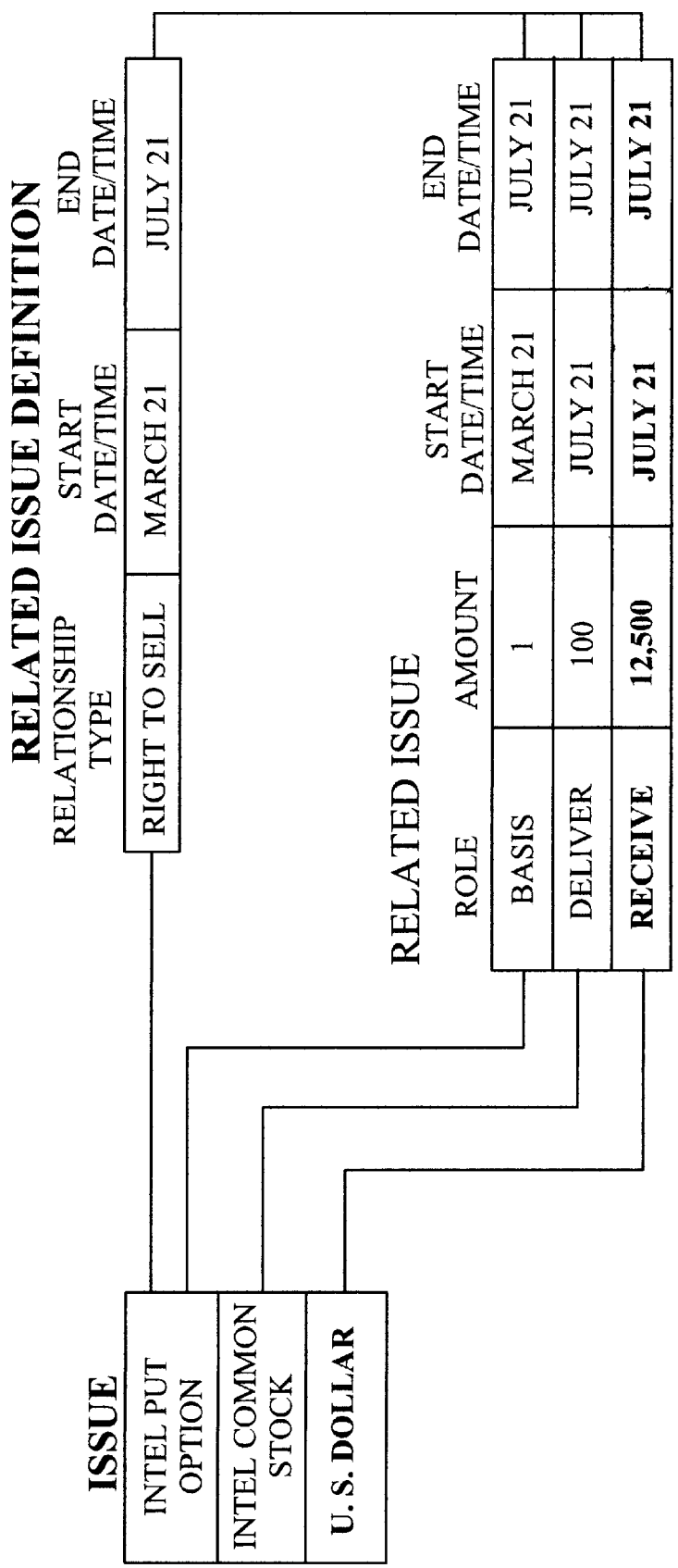
FIG. 8 depicts how market data describing an equity option would be stored according to the invention's data model.

A second example is presented in FIG. 8, which depicts a business object for a stock option. In this example, the issue is a "put" option on Intel common stock, denominated in U.S. dollars. Because the issue is an option on another security issue, a table named "Related Issue" records the fact that the option holder has a right to exercise the option for a specified period of time (March 21 to July 21) and designates the number of shares governed by the put and the price for the put. The Related Issue table also interrelates the stock option to the underlying common stock, Intel Common, which is itself an Issue, as shown.

Figure 9:
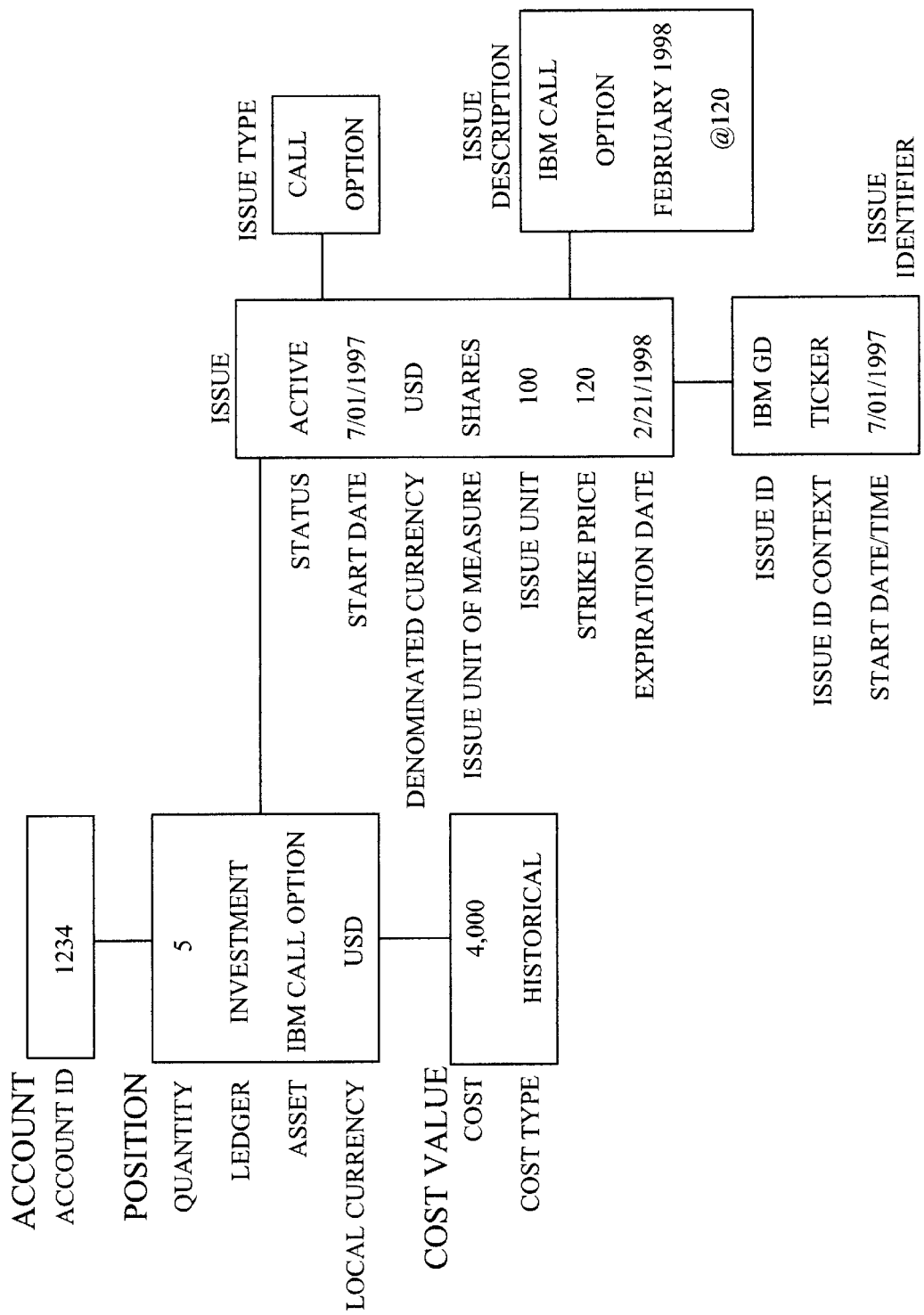
FIG. 9 provides an exemplary diagram delineating the database tables and relationships pertaining to an interrelated instance of the "Account" and "Issue" business objects.

The processing of the put option for a particular account triggers further database storage operations. This is illustrated in FIG. 9, wherein account positions reflect system processing of an option transaction for Account 1234. The account data includes the quantity and cost of the put option (i.e., the "position" in the put option). Concurrent multiple cost values (e.g., historical average cost and mark-to-market) can be maintained for the same position quantity in both local and base equivalent currencies. As shown in FIG. 9, the call option position is related to a set of issue description fields (i.e., the issue table), via a primary-foreign key relationship. In turn, the issue table is connected to tables containing sets of fields for issue type, issue description, and issue identifier. In this way, incoming and processed data and derived information form a web of interconnected values, linked via primary-foreign key relationships embedded in the database.

The business objects have a third dimension that enhances information coherence and comprehension. This is depicted in the schematic diagram of FIG. 10. As presented, data and information in the database have levels of abstraction from the raw incoming transactions to the accounting positions and balances that are derived therefrom, to consolidations of positions and balances by legal entity, customer, counterparty, currency, employee, and the like. This denotes important data groupings across plural accounts. Each trading or customer account will have many positions and cash balances simultaneously maintained for it. For example, accounts all handled by a single trader, or for a single counterparty, are all connected and views of this data become accessible in a consolidated presentation. These interrelationships reflect quick roll-up assessment and drill-down research and from/to derived information to/from detailed data. These interrelationships also reflect a horizontal dimension to the vertical roll-up/drill-down structure such that updates to positions and balances also update summaries by currency, fund, broker, and the like.

Figure 11:
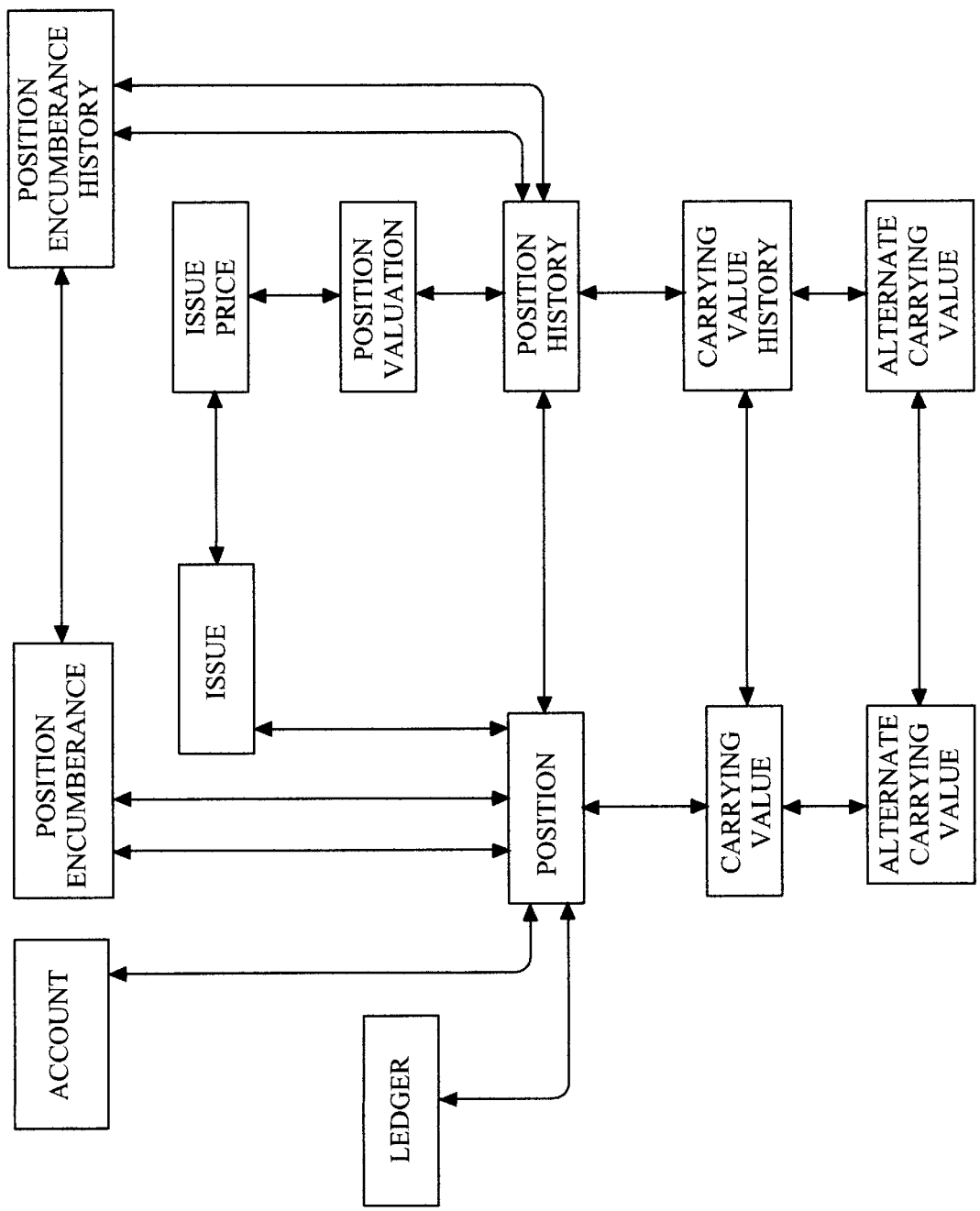
FIG. 11 provides an exemplary diagram delineating the set of database tables and relationships pertaining to a complex business object "Account Positions"

Turning now to FIG. 11, the interrelationships among the data and information is seen across a complex business object. In this diagram, database tables, and their associated elementary business objects are represented by the labeled rectangles, such as "Account", "Ledger", "Issue", "Issue price", and the like. The values in each table are determined by the rules of normalization, most to the third normal form as is per se known in this art. The interconnecting lines reflect a physical primary-foreign key relationship between two tables, and the nature of the relationship, such as its optionality and cardinality.

Figure 10:
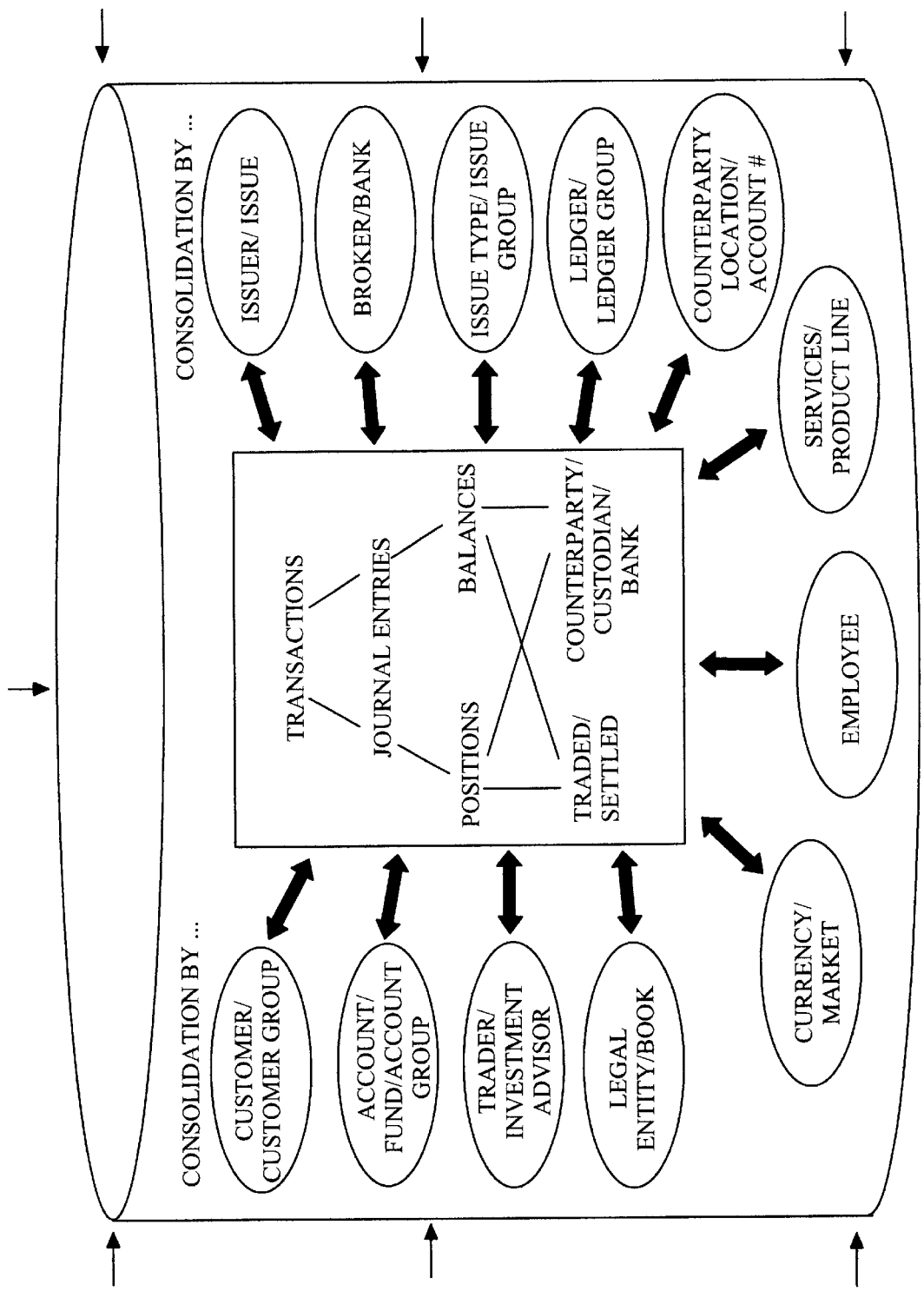
FIG. 10 provides a schematic of the database structure and consolidation relationships.
Figure 12:
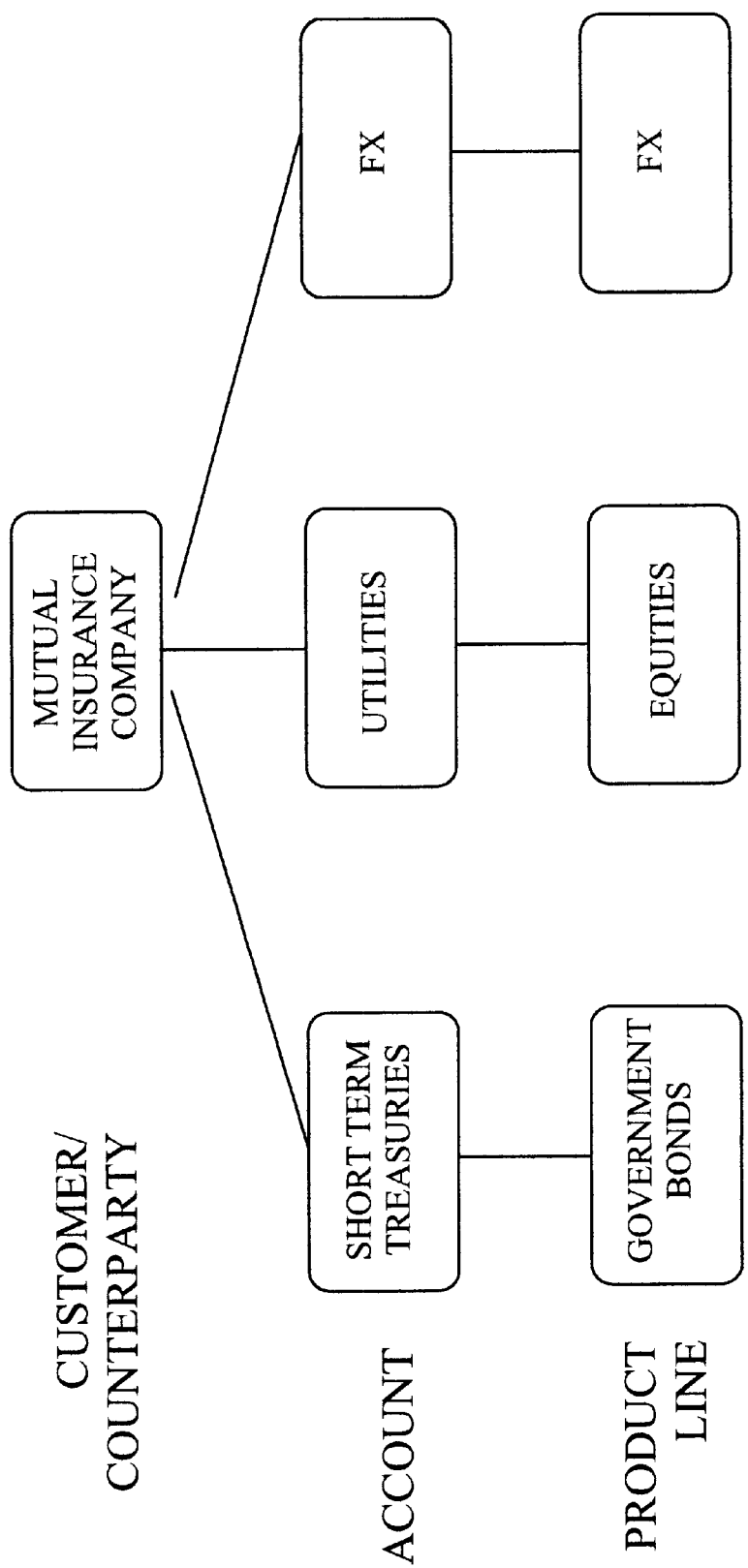
FIG. 12 depicts data consolidation by institutional brokerage customer.

As mentioned in reference to FIG. 10, a critical function of this database infrastructure stems from the function of consolidation of data, in specific contexts important to the financial firm's operations. An example of this type of consolidated database structure is depicted in FIG. 12. In this example, the data and information for an institutional customer/counterparty of a broker/dealer is consolidated. Here, the customer is a (fictitious) insurance company that has separate accounts for buying and selling various classes of investments, i.e., short term treasuries, utilities, and foreign currencies (FX). Using this structure, the positions, balances, and transaction activity in these accounts can also be viewed by the broker/dealer according to its designated product lines, e.g., government bonds, equities, and foreign exchange.

Figure 13:
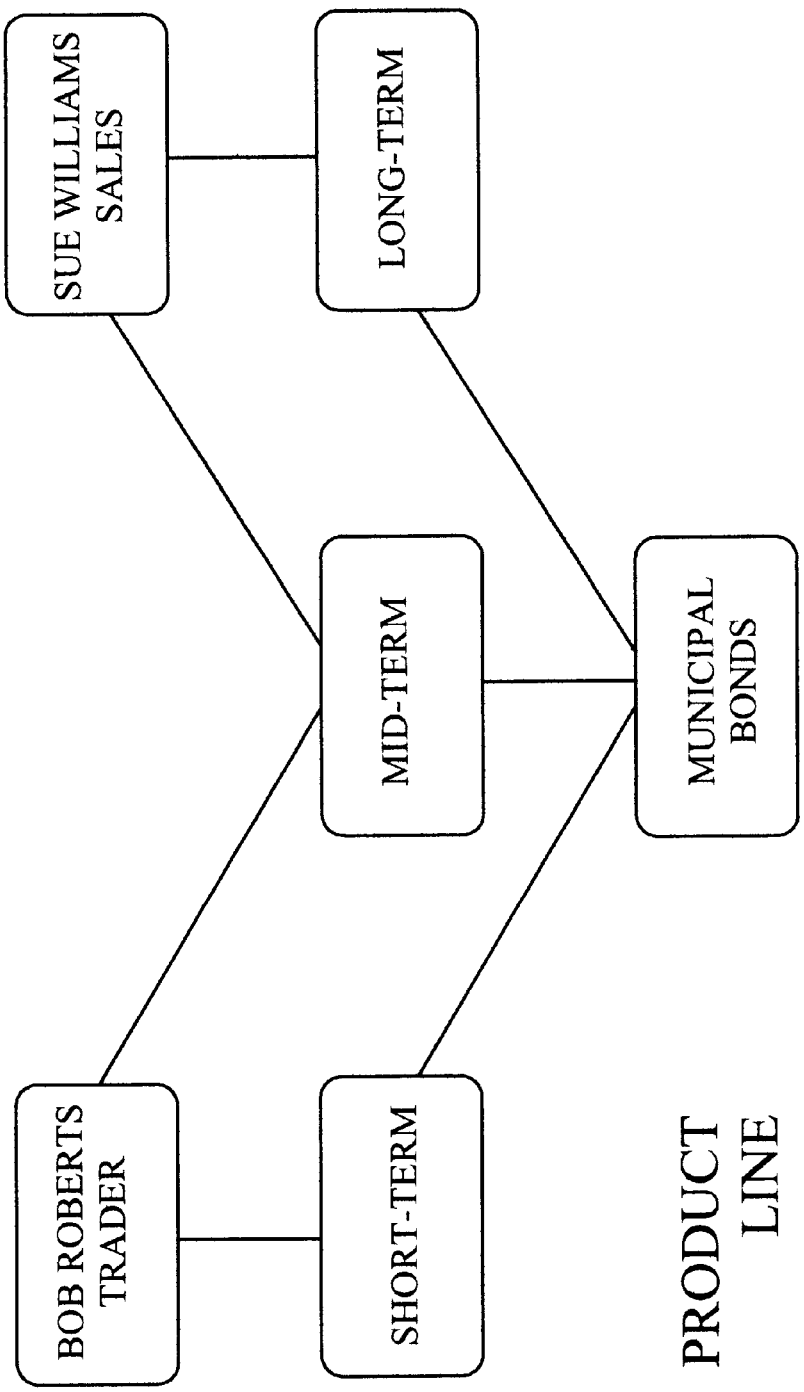
FIG. 13 depicts data consolidation by employees and product lines.

In addition, consolidation is supported for employees and their relationship to accounts and product lines. This is shown in FIG. 13, where Bob Roberts trades in short term and mid term securities from trading accounts that have been established for him in his role as a trader. This link allows consolidation across all the accounts in which Bob Roberts is a trader. In a similar way, Sue Williams relates to the indicated accounts as a sales representative, and the system thus consolidates all accounts for which Sue Williams is the sales person, via this database relationship. As shown in this diagram, all three accounts are consolidated as participating in the municipal bonds product line.

Figure 14:
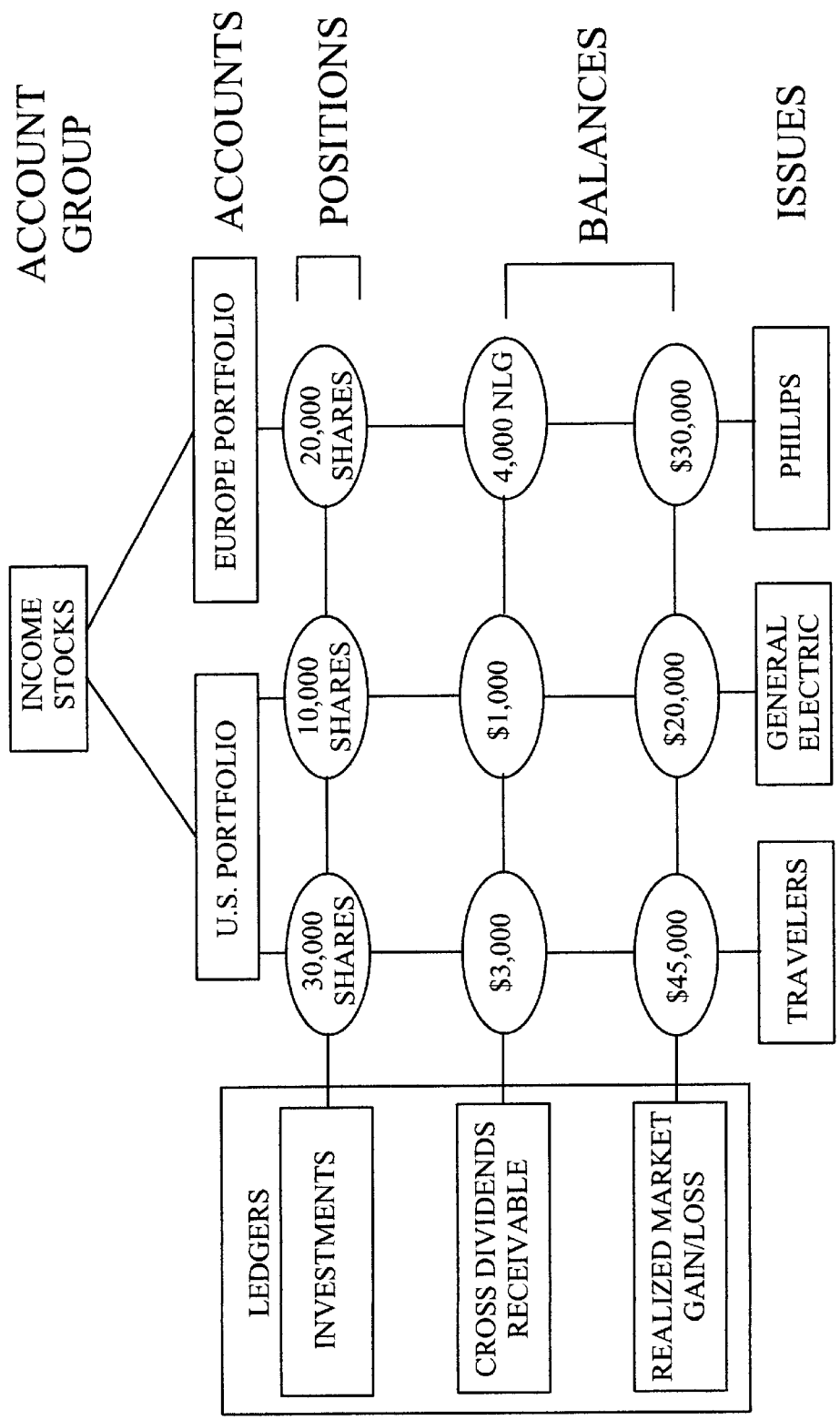
FIG. 14 depicts consolidation across portfolios.
Figure 15:
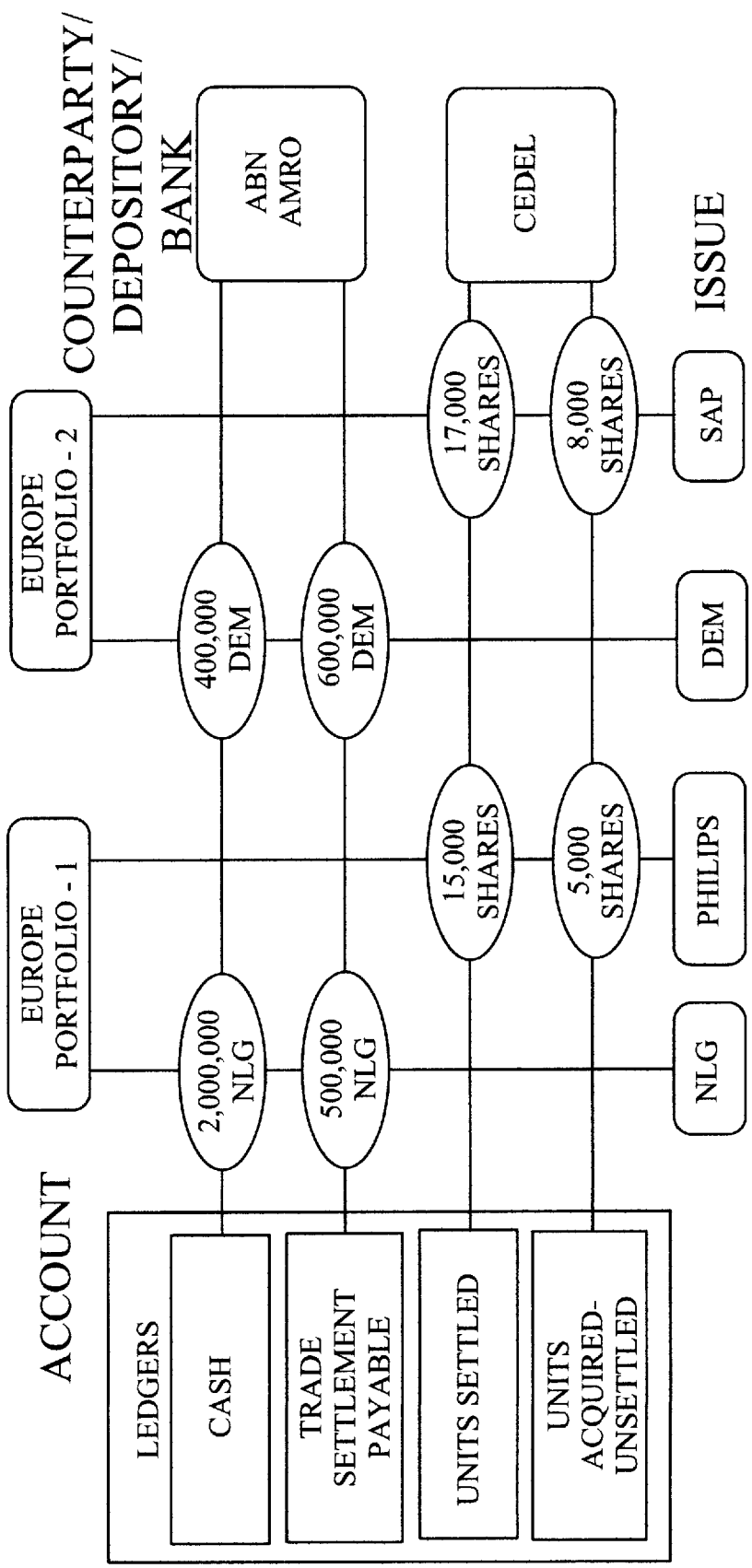
FIG. 15 depicts consolidation across counterparties.

In FIG. 14, the matrix reflects portfolio consolidation across accounts. In this example, an account group links two accounts which hold the U.S. and European portfolios, consisting of vertically related positions, balances, and issues. In the horizontal relationships, the ledger entry for investments consolidates share positions for three companies—Travelers, GE, and Philips—and the balances reflect dividends and realized market gain/loss related to investments in Travelers, GE, and Philips. The gain/loss amounts indicate the ability of the Accounting Information Server to perform tertiary calculations using transaction data and pre-existing information, e.g., calculate gain/loss realized as the result of an asset sale, using the sales amount from the incoming "sell" transaction (i.e., data) and the historical cost basis from the database (information that was derived and stored on the database when previous "buy" transactions were processed). Consolidation by counterparty and currency is shown in FIG. 15 across the accounts "European Portfolio 1" and "European Portfolio 2". Here, the ledger entries are Cash, Trade Settlement Payable, Units Settled, and Units Acquired-Unsettled, reflecting settlement status and amounts settled and pending settlement at ABN AMRO and Cedel.

Figure 16:
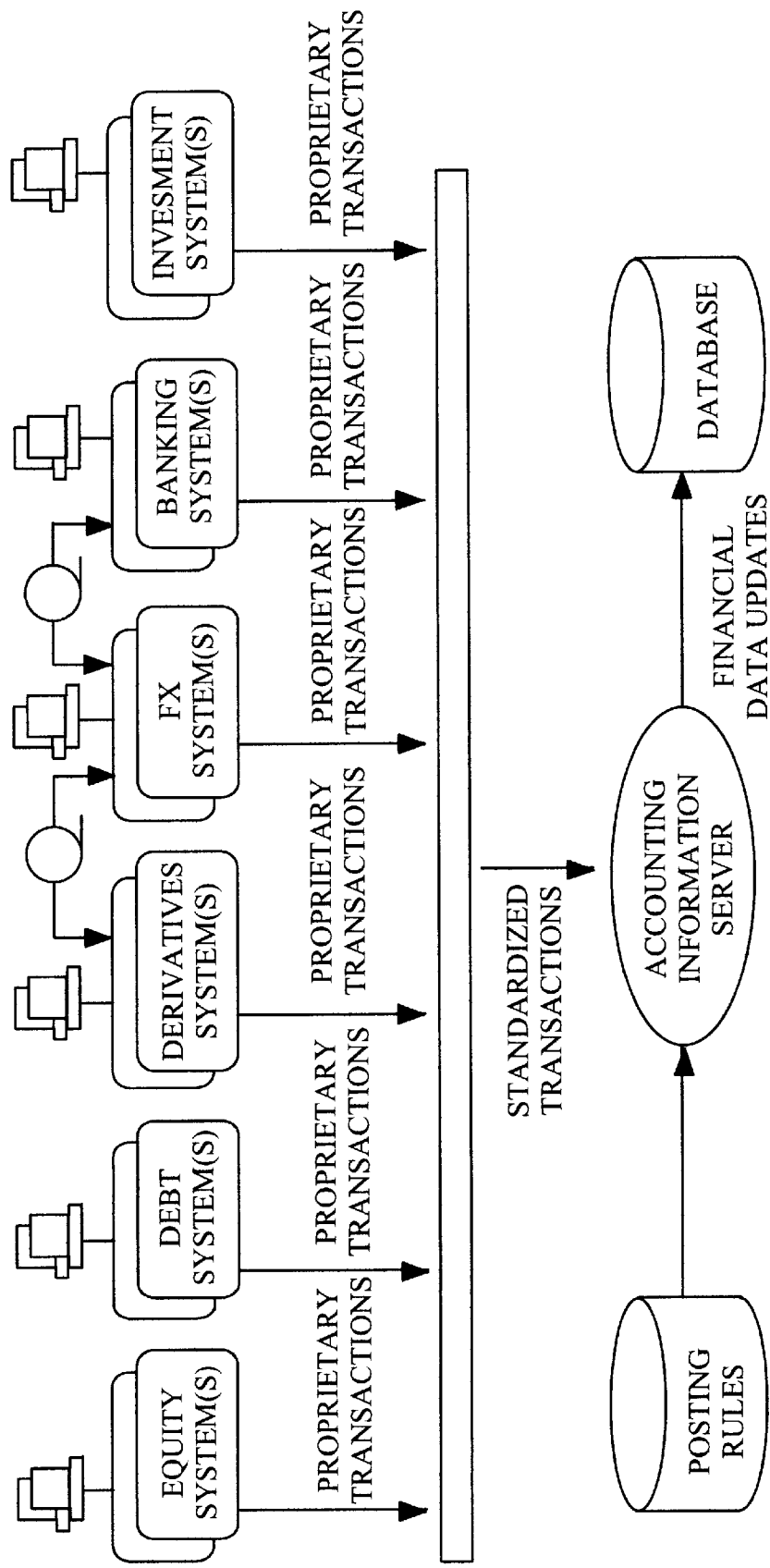
FIG. 16 depicts multiple disparate source systems sending transaction messages to the Accounting Information Server.

Generating multiple views of the impact of transactions, integrated with changes to market instruments or customer/counterparty status (e.g., a change in a price, bond rating, or customer/counterparty credit rating; or a corporate action or bankruptcy announcement), support enterprise analytical processing. Examples of critical analytics performed by major financial firms include risk and liquidity analysis, performance measurement, and compliance with in-house and regulatory standards. Roll-up to the enterprise general ledger system is another form of such analytics, with the inventive system performing the role of an integrated sub-ledger and supporting integrated roll-up to and drill-down to/from the general ledger. Because the inventive system standardizes disparate data that originates in disparate systems (as indicated in FIG. 16), and makes both the standardized data and the information that is derived from the incoming data accessible via standard business objects, the development of proprietary analytic applications, and integration with commercially available analytic applications, is greatly streamlined. Block 150, FIG. 4.

Figure 17:
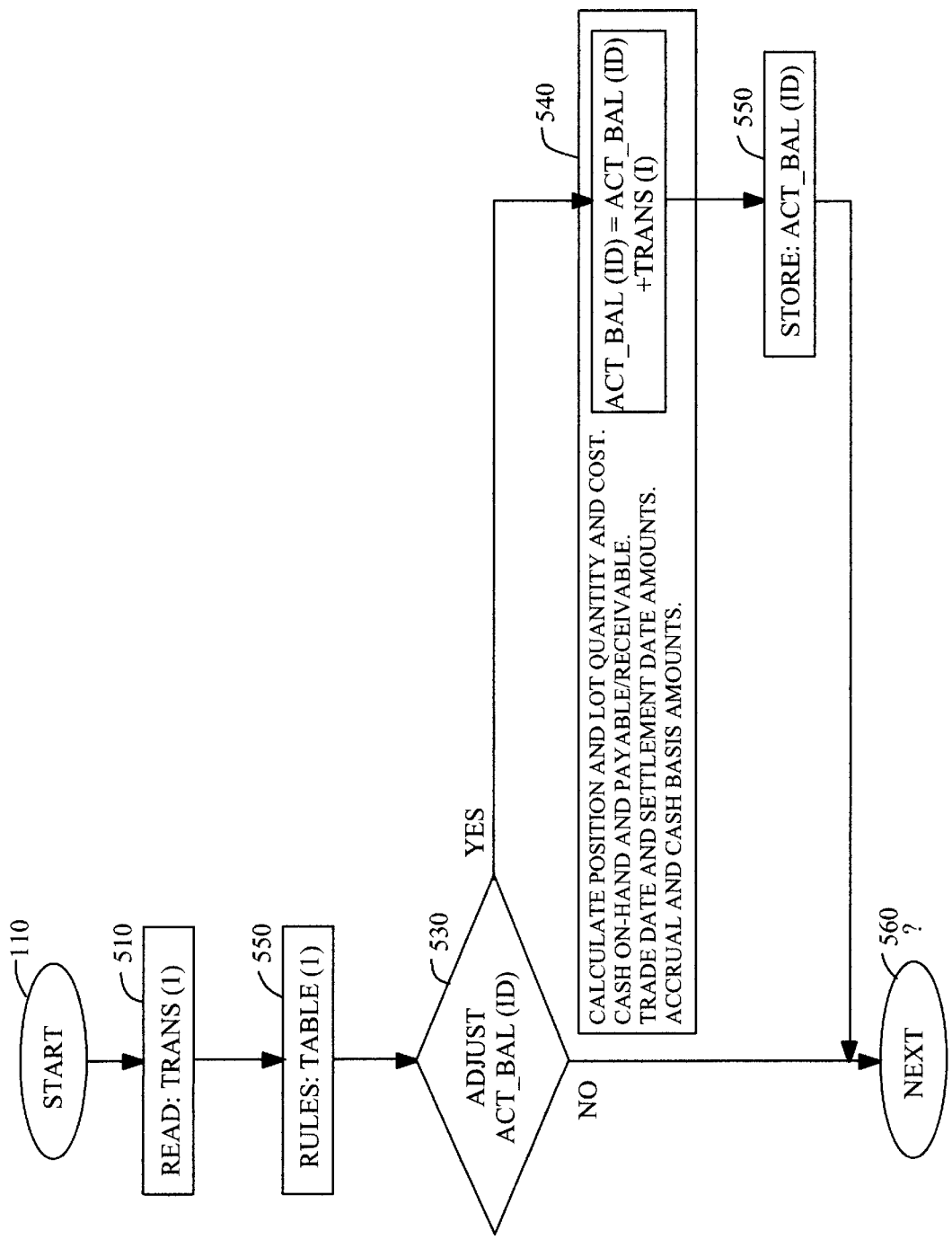
FIG. 17 provides a simple logic diagram for the Accounting Information Server.

An exemplary operation of the Accounting Information Server is depicted in FIG. 17. At block 510, the enriched transaction, Trans(1) is read to assess its transaction type (e.g., "buy", "sell", "dividend", "deposit", and the like) and the transaction event (e.g., "order", "execution", "contractual settlement", "actual settlement", "payment", and the like). At Block 520, the set of business rules for the transaction-event combination (e.g., "sell-execution") is retrieved by the rules business objects. Illustrated here, the Accounting Information Server determines from the transaction such data as the account number, issue id, issue quantity, cash amount and currency id, counterparty, effective date(s) and the like. From the business rules, the Accounting Information Server determines what ledgers, positions, lots, and balances must be adjusted by the amounts in the transaction. At block 540, the appropriate new amounts are calculated and the new values, ACI Bal (ID) is stored in the database, block 550, complete with interrelated journal entries that record the delta (DB/CR) between the previous values and the new values.

This process is repeated for all business rules that apply to the incoming transaction. For a stock "sell" transaction, the account holder's cash balance will be increased, the stock position reduced, the commission payable increased, the gain/loss calculated and adjusted, the margin position adjusted, the collateral position adjusted, and so on as directed by the set of business rules for that transaction event for that account. Corresponding and offsetting entries will simultaneously be made to the accounts which represent the broker/dealer's, custodian's, investment manager's, or trustee's securities inventory and cash balances, as directed by the business rules for that transaction event. If the nature of the transaction is such that it also requires posting's to the firm's internal inter-company accounts, these will be made as well, according to pre-established business rules for doing so.

Figure 18A:
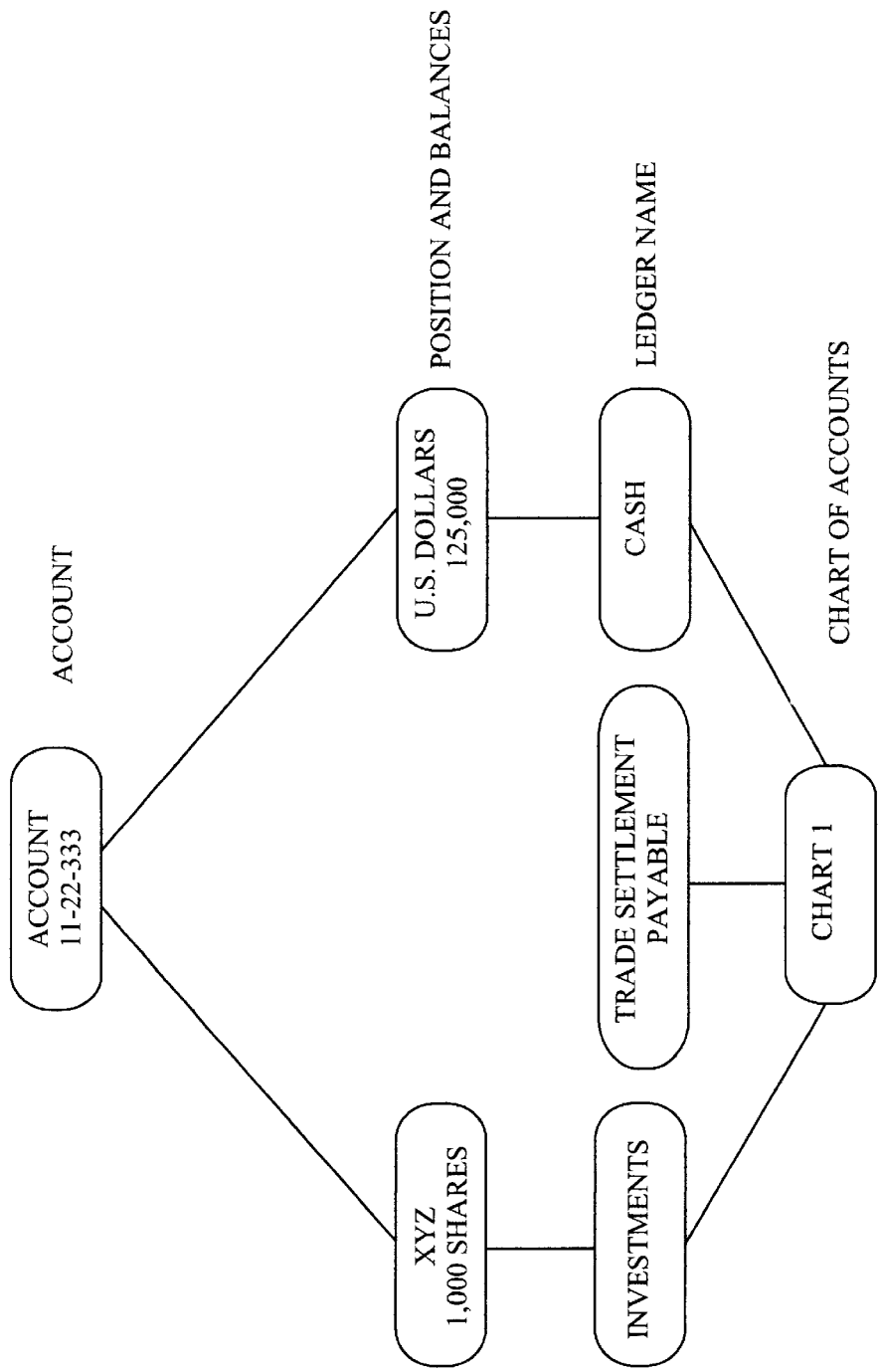
FIGS. 18(A,B,C) is an exemplary diagram delineating a set of database tables as valued by the Accounting Information Server for a buy-execution and a buy-settlement transaction.
Figure 18B:
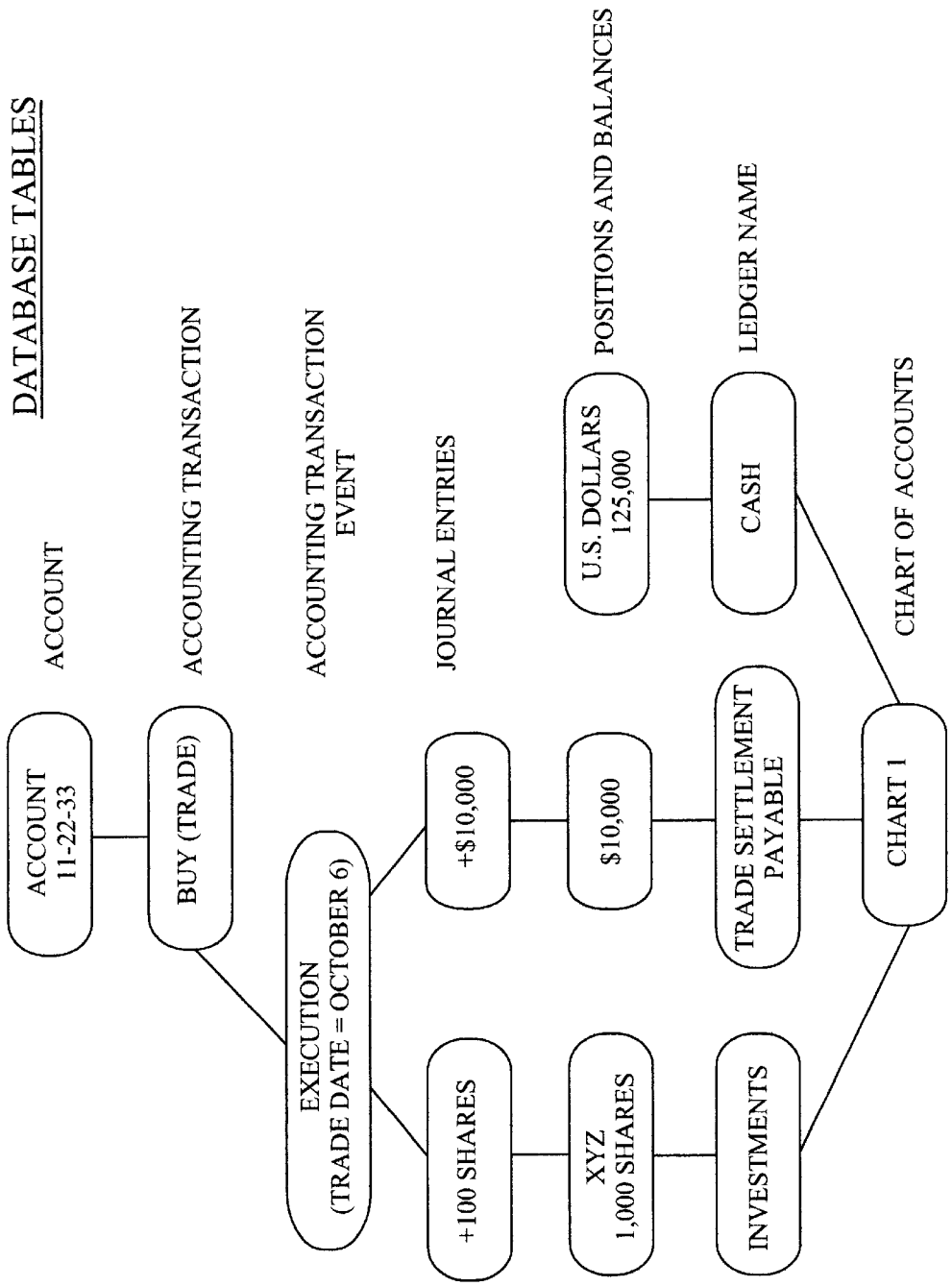
Figure 18C:
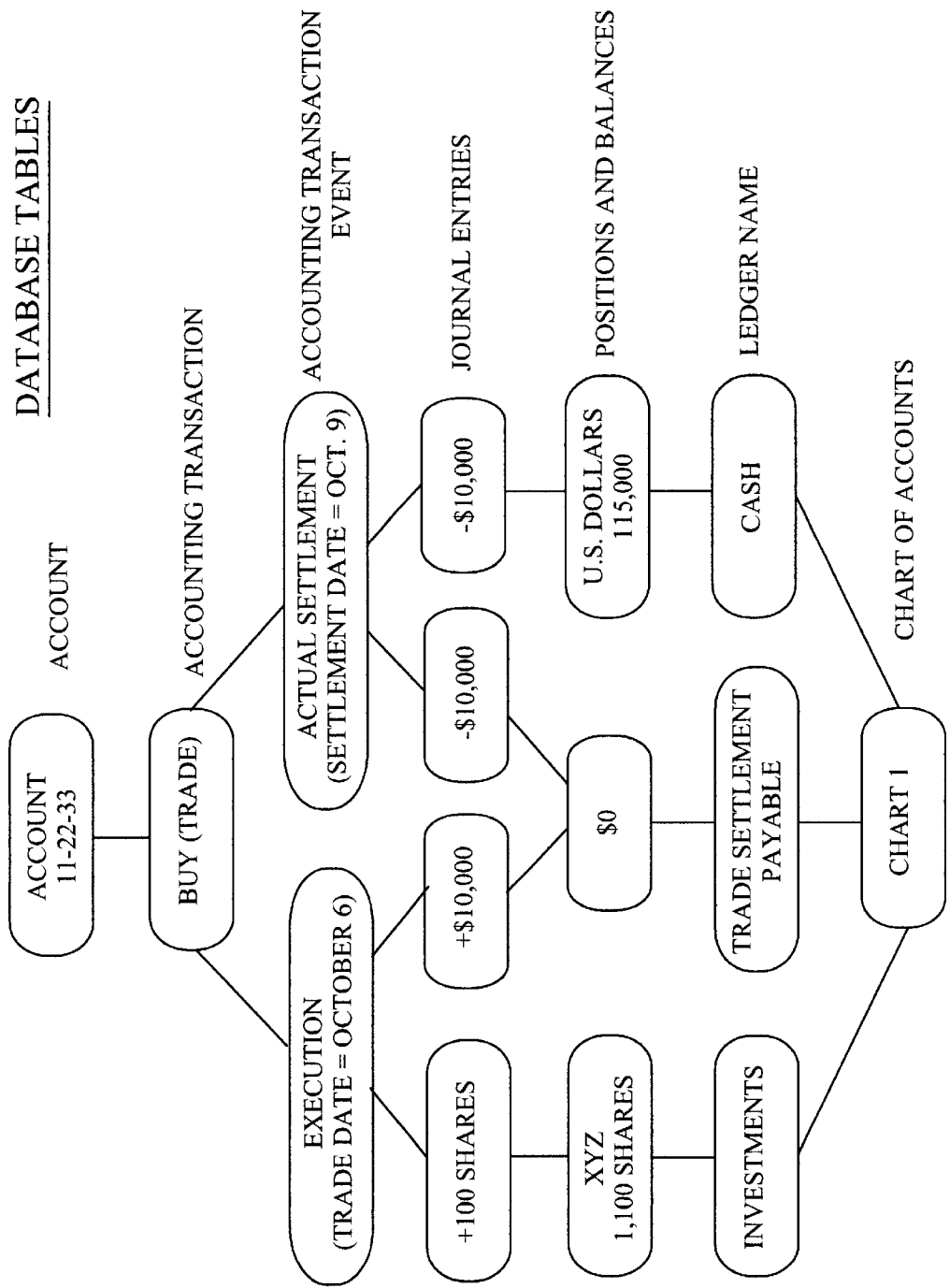

FIG. 18, which shows an example of the database entries that result after a "buy" transaction has been processed through two events: "execution", and "actual settlement" three days later. Adjustments made to positions and balances are recorded in journal entries. As indicated by the connecting lines in this Figure, for each transaction event, each value that results from the event is connected by primary-foreign key relationships when the value is stored on the database. As also indicated in FIG. 18, each position or balance is classified according to a Ledger name, (e.g., "Trade Settlement Payable", "Cash") and a set of Ledgers are collectively given a Chart of Accounts name ("Chart 1").

Figure 19:
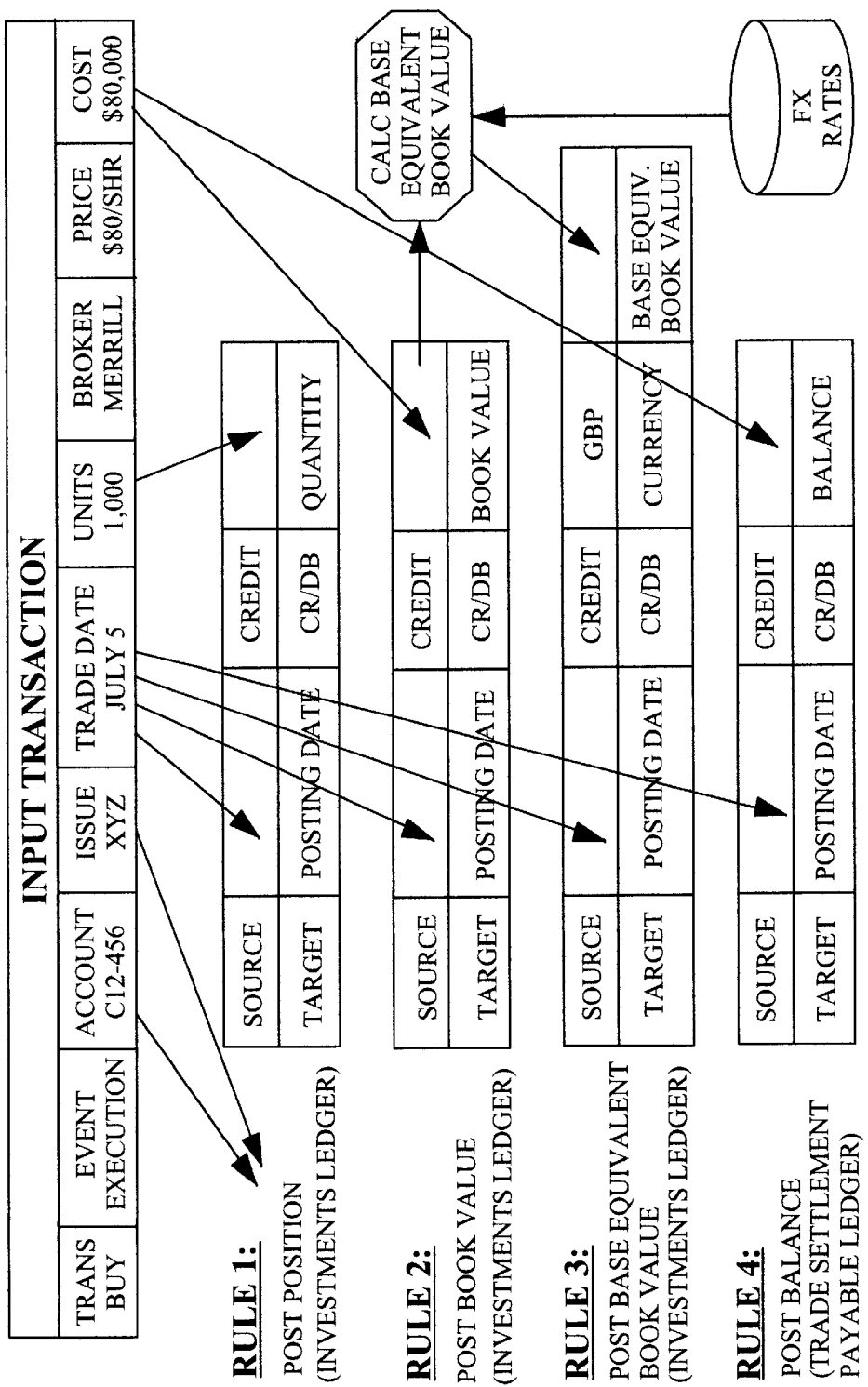
FIG. 19 is a diagram of a business rule set executed by the Accounting Information Server.

Turning now to FIG. 19, an exemplary business rule set is presented. In this example, the system applies Rule (I) taken from the stored rule database or object cache, which is directed to processing "buy-execution" transactions. There is a select set of business rules for a "buy" of a security on the execution event; another set of business rules for the "buy" of the security on the actual settlement event; and so forth. Each transaction-event combination has a set of business rules associated with it. Additionally, this set of rules can vary by account type (e.g., the rules for recording the effect of a "buy-execution" for a retail brokerage customer may be different, or be a subset of, the rules for recording the effect of a "buy-execution" for an institutional trust customer).

Figure 30:
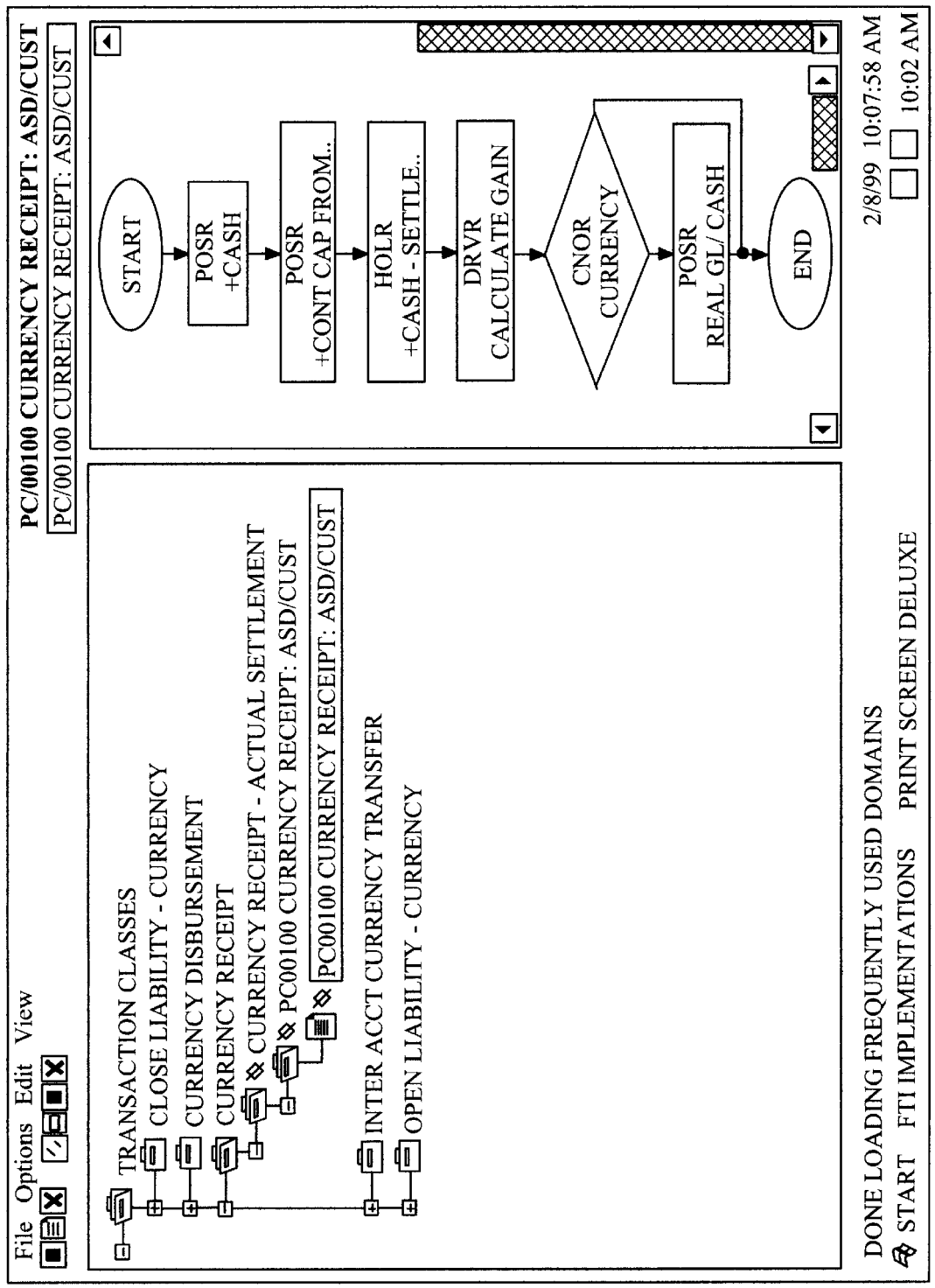

Over time, the library of business rule sets can be modified and expanded by the user, by using the System Deployment Kit (SDK), 141 FIG. 4, and FIG. 30, a browser-based application that is designed for that purpose, as well as instructing activities of the system (user authorization, define additional message formats, map external formats to the desire formats, and the like). In this way, the information content of the database is caused to be expanded or adjusted without modifying the Accounting Information Server source or executable code. This is an important capability. Since adjustments to the business rules leave the underlying code intact, there is no requisite testing debugging and re-release of the executable software after adjustment or addition of business rules—only the rules need be tested.

The business rules-driven architecture allows information to be customized for different individuals and institutions, such as those that subscribe to various products and services. As a result, users can introduce new services and implement needed enhancements much more quickly than when trying to do the same by using code that is not driven by business rules. Additionally, rules may be stored in tables and/or may be generated into executable objects, which results in increased execution speed.

Continuing with FIG. 19, the business rule set for a "buy-execution" event for security "xyz" is depicted. The first business rule instructs the Accounting Information Server to "post" the XYZ position quantity in the investment ledger (ledger name ="Investments") for Account C12-456, with the values in the fields:

1. Posting date,
2. Quantity, and
3. Credit/Debit (Cr/Db).

Rule 2 instructs the Accounting Information Server to post the Book Value for this quantity of XYZ shares with the amount in the input "Cost" field (i.e., $80,000).

Rule 3 instructs the Accounting Information Server to calculate and post the Base Currency Equivalent Book Value, based on the book value that was posted in rule 2. The Base Currency Equivalent Book Value amount is calculated using currency exchange rates taken from the database (the Market Data Information Server keeps the database updated with current currency exchange rates). The inventive system includes a collection of select financial algorithms for performing numerous such financial calculations (e.g., gain loss, amortization, accretion, accrued interest, and the like) in multiple currencies. Additionally, the open architecture permits introduction of proprietary and third-party algorithms as needed over time.

Rule 4 instructs the Accounting Information Server to post the cash amounts for the account balance field in the Trade Settlement Payable ledger.

In addition to the above example, this event will trigger a string of ancillary operations. This will include checking to see if a limit has been crossed; if so the notification server electronically sends to user(s) or application(s), via the Message Bus, an electronic notification that alerts them to the fact that a limit has been exceeded. It will also trigger secondary calculations and updates for value-at-risk, profit/loss, and portfolio performance, and the like, delineated for each interested party, e.g., the customer, dealer, broker, investment manager, and/or counterparty. Similarly, the inventive system performs assessments of firm compliance (e.g., fund, customer, and regulatory), liquidity (i.e., collateral availability), and credit and country/market exposures. Based on the results of these assessments vs. stored thresholds, real-time alerts will be communicated by the notification server to firm managers and/or customers.

In addition to having the ability to invoke objects that perform calculations, business rule sets can also contain logical testing ("if . . . , then" statements) to perform select rules only in the event that a designated Condition exists.

Figure 20:
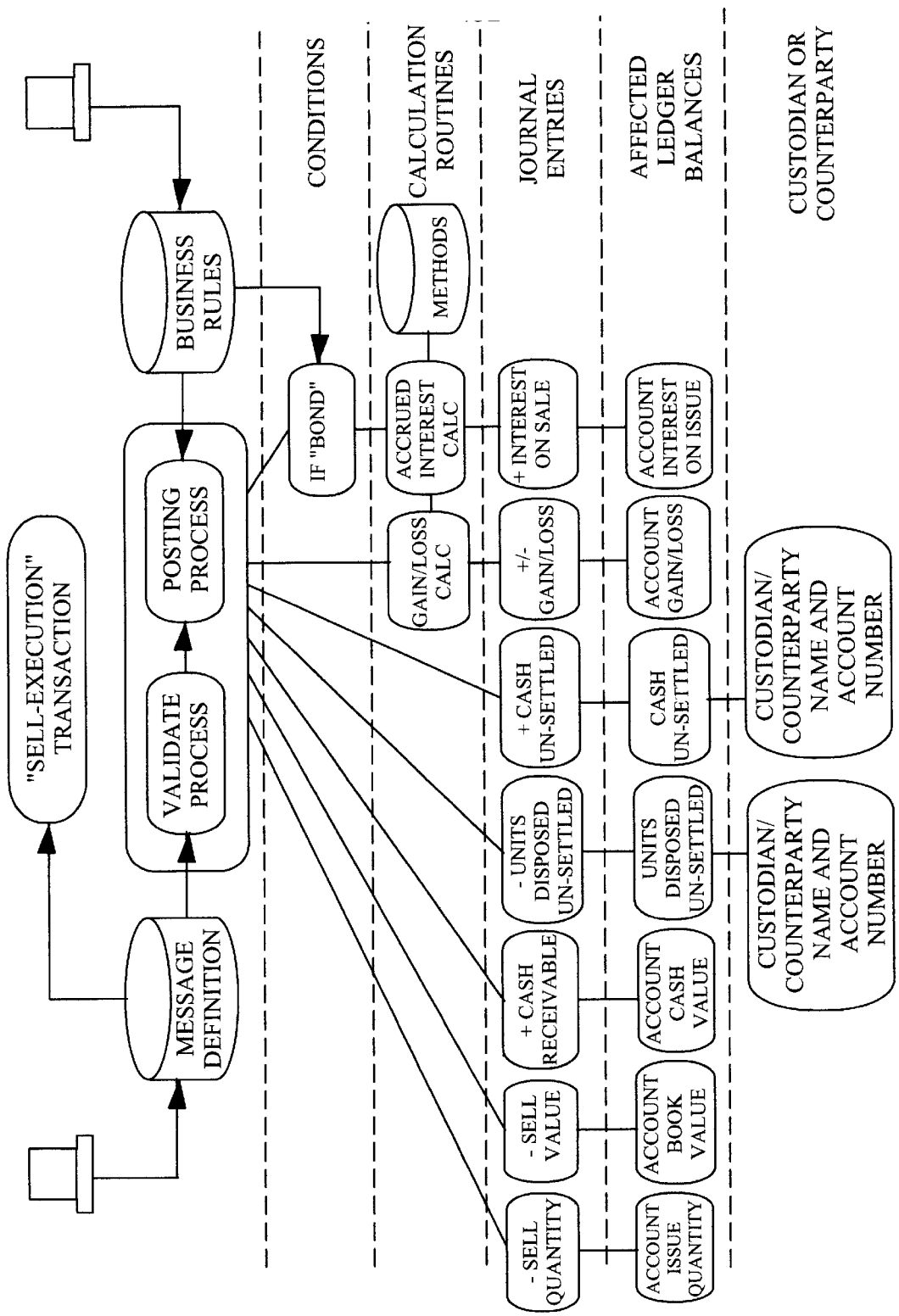
FIG. 20 is a diagram of the posting process performed by the Accounting Information Server.

These general operations are presented in FIG. 20, wherein the Accounting Information Server applies the business rules to the incoming "sell-execution" message. Based on this, the posting process is triggered and proceeds in response to the specified business rule set, deriving and posting journal entries to ledger positions and balances, accordingly.

While the foregoing discussion has focused on the Accounting Information Server, the system further comprises a Market Data Information Server, 111 FIG. 4. The Market Data Information Server concurrently processes market data, such as prices, indicative data (full financial description of a security), and corporate action announcements. It processes this data for virtually all types of securities, commodities, loans, and other financial instruments, denominated in any currency and described in any language.

The process for initially populating the database with market data, and thereafter updating the database with changes or additions to the initially stored market data, parallels that used for accounting data. Specifically, market data is received in transmissions from numerous data vendors, such as Bloomberg®, Reuters®, and the like, and is formatted into messages that are transported along the Message Bus to the Controller. After editing, validating and enriching the message, the Controller directs the enriched message to the Market Data Information Server.

The Market Data Information Server processes the enriched messages and fills and/or updates fields in the database, in accord with four steps: (i) Acquisition, (ii) Validation, (iii) Construction, and (iv) Distribution. This is described below.

The general arrangement for the Market Data Information Server is presented in FIG. 4 in relation with the other subsystems of the present invention. The Market Data Information Server processes the message by applying business rules that instruct it as to how the user wants it to do such things as prioritize or merge data that is received from multiple sources for the same instrument; send an alert to a price research analyst when a price change tolerance limit has is exceeded; and other quality assurance functions. After processing the message according to the business rules, the Market Data Information Server stores the input and results in the database, 130 FIG. 4, identifying the external (e.g., Reuters) or internal (e.g., trading department) source of each data value.

The Acquisition process involves recording data that identifies, cross-references, and describes the characteristics of various securities that are traded on world markets. This data is known as "indicative data". These data vary across the various types of financial instruments. For example, debt securities include characteristics such as interest payable and maturity date, while equities do not. The Market Data Information Server processes multiple transmissions of indicative data (at least one transmission per day from each source), and derives a composite of each financial instrument, by valuing each field from the data source (i.e., data vendor or in-house trader) that historically has been the most knowledgeable and accurate source for valuing that field. For example, for the same financial instrument, the price may come from one source, the dividend payable date may come from another source, and the legal terms and conditions may come from yet another source. For each financial instrument, the business rules designate from which source to obtain the value(s) for each field. Up to 1,000 fields, or more, can be acquired that describe the same financial instrument.

As discussed above, data is first acquired ("Acquisition Process"), and then translated to a common format. This involves sorting and re-sequencing the incoming data transmissions from numerous data vendors, such as Bloomberg®, Reuters®, and the like, as well as collecting data from users that enter data into thin client, browser-based screens, formatting the data into messages, and storing the data in both its original and reformatted formats. For vendor-supplied data the system confirms timely receipt of the data (e.g., provided in accord with scheduled delivery), and confirms that the data complies with that expected from that vendor in terms of completeness and form. Finally, the data is prepared for input to the Validation Process.

The Validation Process ensures the accuracy of the data and prevents duplicative entries. The Validation Process applies quality assurance rules, pre-defined by the user, to the incoming data. The data is compared against pre-existing records to discern any discrepancies, and to test for changes in excess of acceptable tolerances. Missing data is calculated or derived from other data, where possible. Errors and omissions trigger notifications, via the notification server, to the appropriate staff, who can then correct the data using a desktop application. Once completed, the Validation Process presents the enriched information to the Construction Process.

The Construction Process applies business rules for translating the validated data into field entries in the database. Vendor data elements are translated to a format applicable to the corresponding fields in the database, e.g., "maturity date" is translated into one of a series of "principal events" in the life cycle of the financial instrument. Once finalized, the processed data is stored in the database, making it available to feed the Distribution Process.

The Distribution Process involves using the distribution server and alert server to send the stored data to other applications or user desktops. Typically the applications are other server or mainframe applications operated by the same financial firm, but they could be external applications, as well, and can also be individual user desktop computers (e.g., if the system is networked to a Web site from which desktop users are authorized to download market data and other data or information stored in the database; or from which users subscribe to alerts). This involves, in many instances, the re-formatting of the data into a format readable by the target application, such as a legacy application, or re-formatting the data into an XML message.

The Interface Conversion Server, 100, or Alert Notification Server, 160 FIG. 4, is used for such reformatting. The Distribution process invokes need-to-know filtering to restrict sensitive data. The Distribution Server electronically and selectively publishes market data to subscribers for that subset of financial instruments in which each subscriber is interested, and further, publishes that subset of data fields about each financial instrument in which each subscriber is interested (for example, publish corporate action announcements to operations personnel and customers; investment analytics to portfolio mangers; and so forth). The Distribution process further monitors the delivery process to insure completion.

In addition to indicative information, the Market Data Information Server processes inputs containing prices and corporate action announcements. These inputs are processed in accord with the acquisition, validation, construction, and distribution processes delineated above for indicative information. Also, alerts are sent to users and applications when prices change in excess of pre-set change tolerances, and when a corporate action is announced that is voluntary (e.g., a tender offer) in nature and requires a choice to be made by the owner of the security for which the corporate action was announced. In this event, the alert manager tracks to whom alerts have been sent, and whether a response has been received, and when to send an additional "reminder" alert(s). The Alert Notification Server, 160, also uses the Calculation Server, 170 FIG. 4, to calculate the amount of the entitlement resulting from a corporate action (e.g., a stock split) and formulates and sends a transaction message to the Accounting Information Server from which the Accounting Information Server updates the positions that are entitled to the proceeds from the corporate action. Similarly, for corporate actions that have cash proceeds, the Alert Manager, Calculation Server, and Accounting Information Server work together to affect the correct and timely updates to cash (receivable) balances. The Calculation Server, which includes extensible class libraries of financial calculations, is also invoked during other Accounting Information Server processes, as well as by processes executed by other components—such as the Web Server, 120, FIG. 4, the Alert Notification Server, 160, FIG. 4, and the Reporting Engine, 190, FIG. 4—during the normal course of processing. Examples of information that is calculated by the Calculation Server include real-time buying power (e.g., for active traders who buy on margin), market value, accrued margin interest, amount available for loans (loans of cash or securities), margin maintenance requirement, credit limit, and the like.

There are approximately 5 million publicly traded securities (stocks, bonds, futures, options, and the like) in the world. Various market data vendors focus on researching different classes of securities (e.g. Reuters—international equities; Bloomberg—bonds). There are approximately 1200 market data fields that Bloomberg researches, and transmits to its subscribers, daily. Subscribers who have the invention will process transmissions from Bloomberg, Reuters, and the numerous other providers of market data, and store the combined and consolidated results in the invention's database. As an example of market data, Table I categorizes the 1200 market data attributes (fields) that Bloomberg researches, primarily on bonds (a.k.a. "fixed income") securities. There are many sub-types and varieties of fixed income securities, which is the reason why there are 1200 attributes. Table I categorizes these 1200 attributes into 16 categories:

TABLE I

| | |
|---|---|
| 1. | Issue Identifier |
| 2. | Issue Price |
| 3. | Issue Quality Rating |
| 4. | Letter of Credit |
| 5. | Mtg - Adjustable Rate |
| 6. | Mtg - Prepayment |
| 7. | Mtg - Whole Loan |
| 8. | Option Adjusted Spread |
| 9. | Option |
| 10. | Origination Details |
| 11. | Price Analytics |
| 12. | Technical Indicators |

TABLE I-continued

13. Yield
14. Principal & Income
15. Statistical Details
16. Issue Indicative/Descriptive The Construction Process creates multiple identifiers for issue "name" and records and stores multiple daily "prices" for the same issue (e.g., high, low, bid, ask, etc. on each exchange, as reported by each price source).

Figure 21:
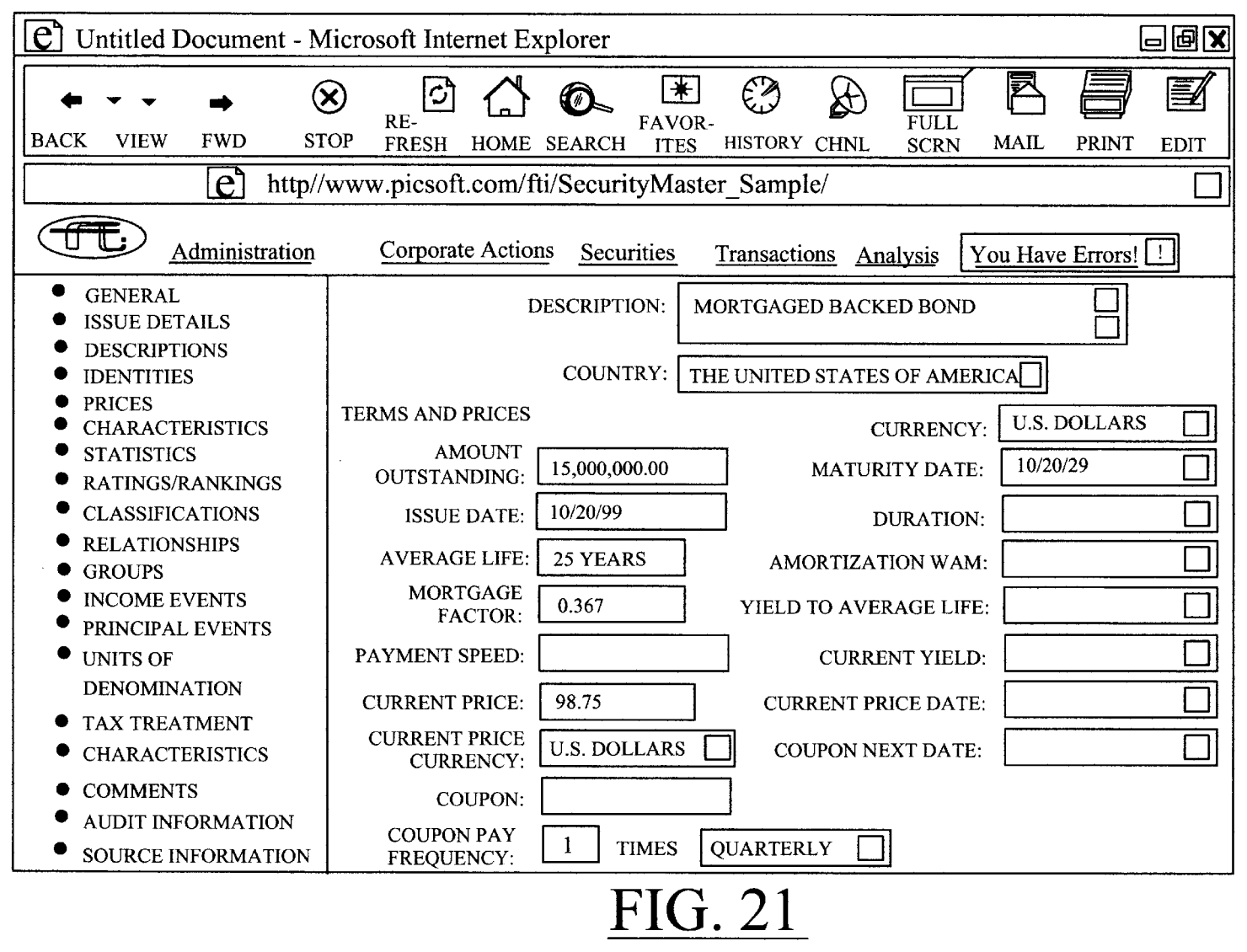

Finally, the Market Data Information Server has a complementary desktop application, 140 FIG. 4 and FIG. 21, that allows users to enter messages for updating the market data, including entering data describing new financial instruments and updating data describing financial instruments that have been previously entered, establishing groups of financial instruments (such as the instruments that comprise an index), and the like (see FIG. 21). A full set of inquiries is also included at 140. This desktop application conforms to the thin client/Web Server architecture that is further described below. The system further comprises a Customer/Counterparty Information Server, 112 FIG. 4. The Customer/Counterparty Information Server essentially operates the same way that the Market Data Information Server operates, only on messages that contain updates to customer and counterparty data. Such data includes name, address, and instructions (e.g., investment, trading, cash sweep, and settlement instructions) for processing the transactions of the customer or counterparty, and for how to provide the customer or counterparty information (e.g., reporting instructions, on-line authorization/subscription). The Customer/Counterparty Information Server also provides facilities for defining what data and information customers, counterparties, and employees are authorized to retrieve from, and enter into the system.

Figure 22:
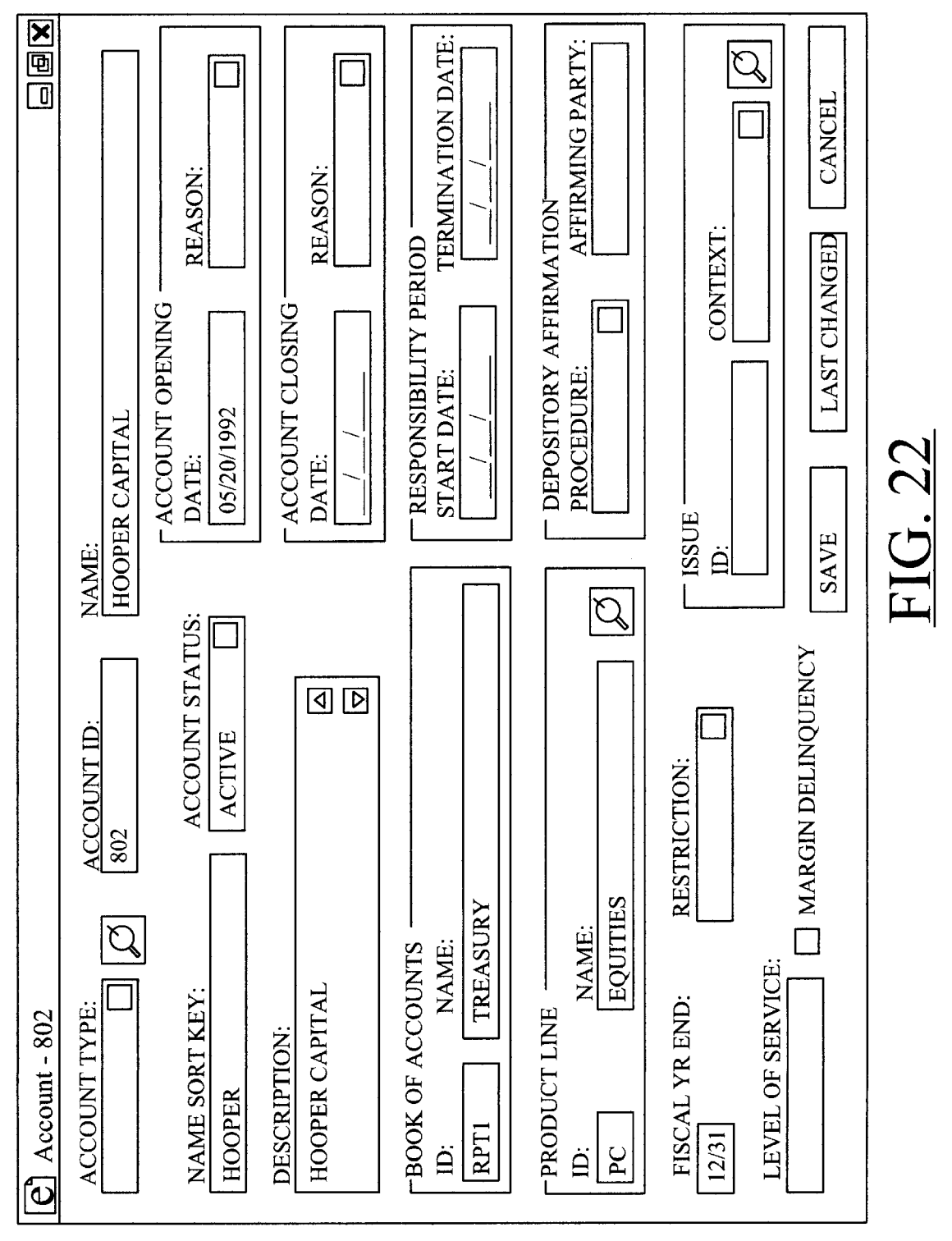

Similar to the Market Data Information Server, the Customer/Counterparty Information Server has four processes: (i) Acquisition, (ii) Validation, (iii) Construction, and (iv) Distribution. However, rather than sourcing its data from data vendors, the Customer/Counterparty Information Server typically sources its data from the multiple legacy customer and counterparty data files that have been accumulated by the financial firm over time, as well as sourcing its data from direct entry from user desktops. Finally, the Customer/Counterparty Information Server has a complementary desktop application, 140 FIG. 4 and FIG. 22, that allows users to enter messages for processing by the Customer/Counterparty Information Server, including establishing new accounts, linking customers to accounts, establishing account groups, assigning responsibilities for customers and counterparties to employees, organizational units, geographic locations, and the like. A full set of inquiries is also included. This desktop application conforms to the thin client/Web Server architecture that is further described below.

As previously mentioned, the critical function performed by the instant invention is to place integrated data regarding, and information derived from financial transactions, positions, lots, and balances (settled and pending);the universe of financial instruments; customers and counterparties, employees and organizational units; and financial institutions in front of select groups within the financial firm as well as its customers and counterparties continuously as the data and information changes in real-time or near real-time. To provide users access to the data and information, for both retrieval, alerts, and input, the system supports access by any web-enabled access device, 140 FIG. 4, such as desktop computers or smaller hand-held devices that operate proprietary or commercially available browsers such as Netscape Navigator® or Microsoft Internet Explorer®. Using such access devices, individuals can connect to a web portal, either via the Internet, an intranet, or an extranet, and perform a wide variety of functions using a user interface (UI) that dynamically configures itself to display only those functions that the user is authorized to perform, only that subset of the data and information (e.g., subset of accounts, customers, and financial instruments) that the user is entitled to retrieve, update, or be alerted about only those options applicable to the subject (e.g., the "interest rate" field appears on the trade entry screen for bonds, but not for stocks). Note: This is the function of the Model Visualization extension, 145 FIG. 4, to the Web Server, 120, FIG. 4.

and the presentation style (e.g., colors, fonts, background, date format, language) that the individual user prefers.

Figure 23:
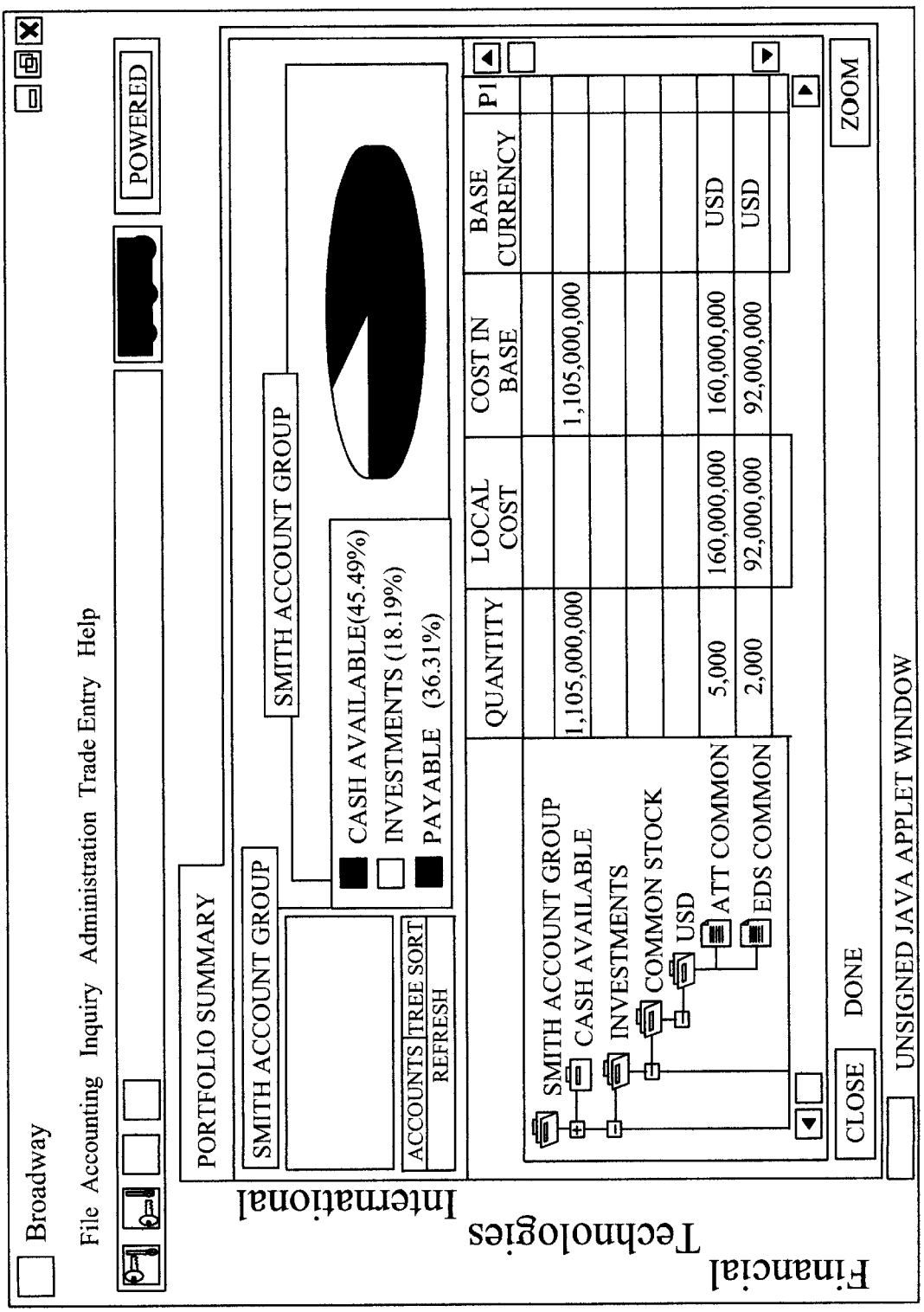
FIG. 23 is a screen display for the Portfolio Summary, a browser-based user interface.
Figure 25:
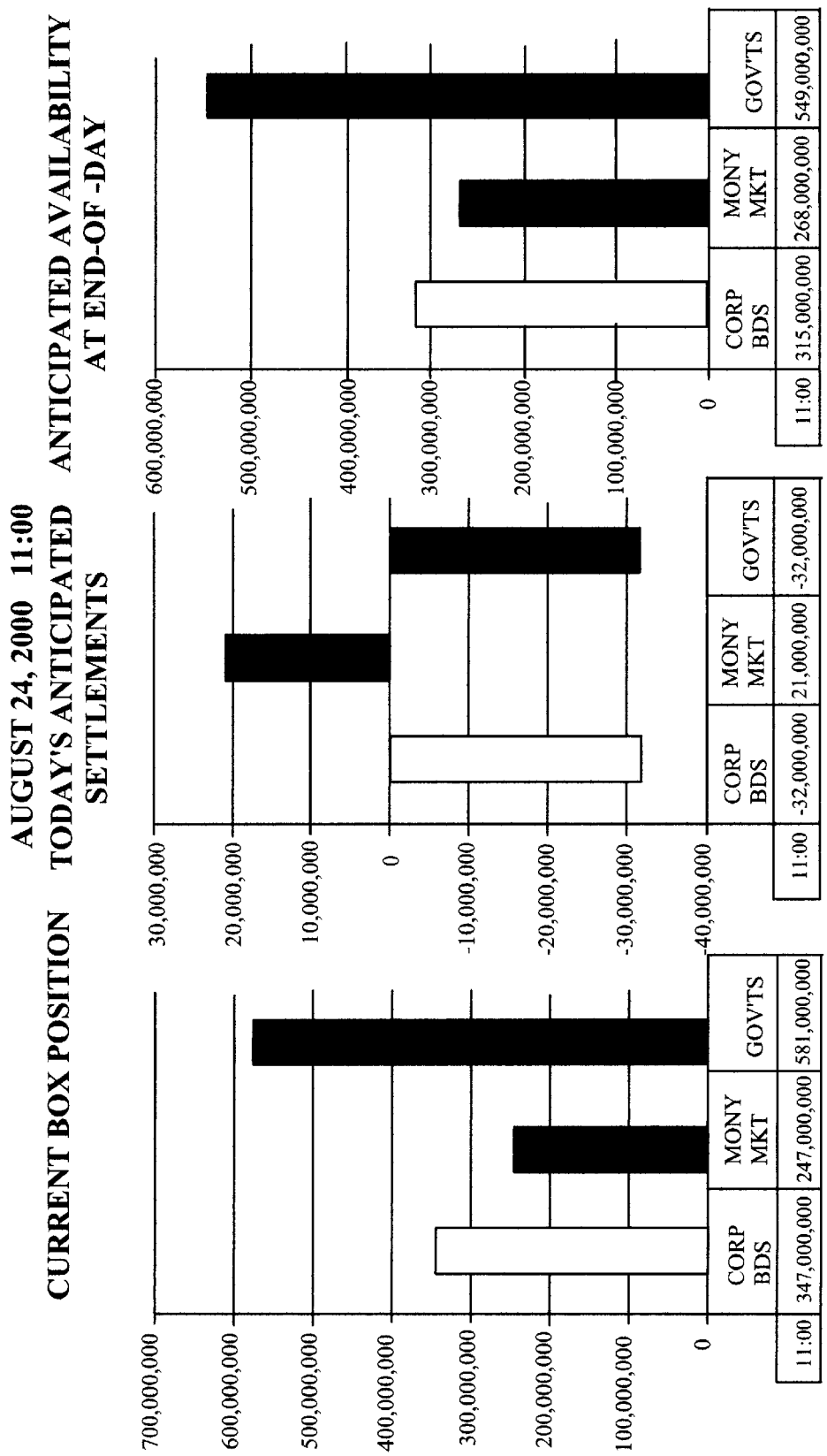
FIG. 25 depicts a real-time histogram that reflects the consolidation of settled and pending positions, balances, and transactions from multiple accounts for multiple financial products at a precise moment in time. The histogram is accessible from a browser-based user interface.

Examples of functions that can be invoked by the UI include:

Retrieve positions, balances, and transactions reflecting the consolidation of settled and pending positions, balances, and transactions from multiple accounts for the same customer, counterparty, trader, investment manager, legal entity, location, financial instrument, currency, and the like. See FIG. 25. Value the positions (in virtually any type of privately held or market-traded financial instrument, commodity, derivative, or banking product) and balances in both trade currency and multiple base equivalent currencies using a variety of pricing models, including market value, margin value, and liquidity (a.k.a. repo) value. Perform asset allocation, performance, liquidity, risk, compliance analysis on the consolidated positions, balances, and transactions. Drill-down from positions and balances to individual settled and pending transactions, historical journal entries, and anticipated journal entries. An exemplary presentation for this application is provided in FIG. 23, titled "Portfolio Summary". The presentation is divided into three panels-Account Lists, Display, and Tree.

Figure 24:
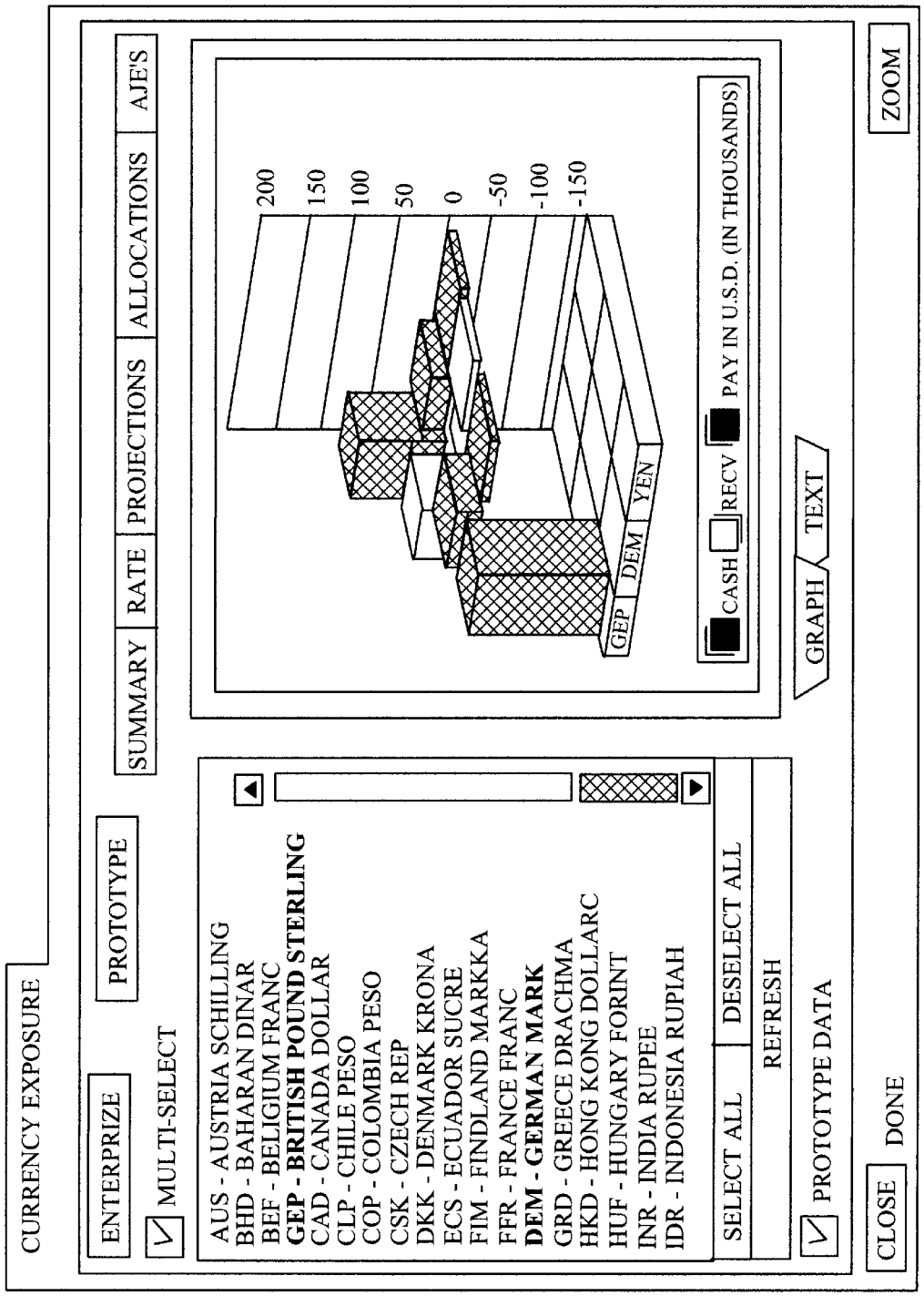
FIG. 24 is a screen display for the Currency Exposure, a browser-based user interface.

Consolidate cash balances, payables, and receivables in selected currencies and translate into a base currency equivalent. An exemplary presentation for this application is provided in FIG. 24.

Consolidate future cash flows in selected currencies and translate into a base currency equivalent cash flow forecast for any number of days.

Retrieve comprehensive information about virtually any publicly traded financial instrument plus any proprietary financial instrument offered by the financial institution.

Retrieve comprehensive information about virtually any customer or counterparty of the financial institution.

Display alerts in real-time, and optionally re-display an alert if it has not been acknowledged by the user within a designated period of time.

Figure 26:
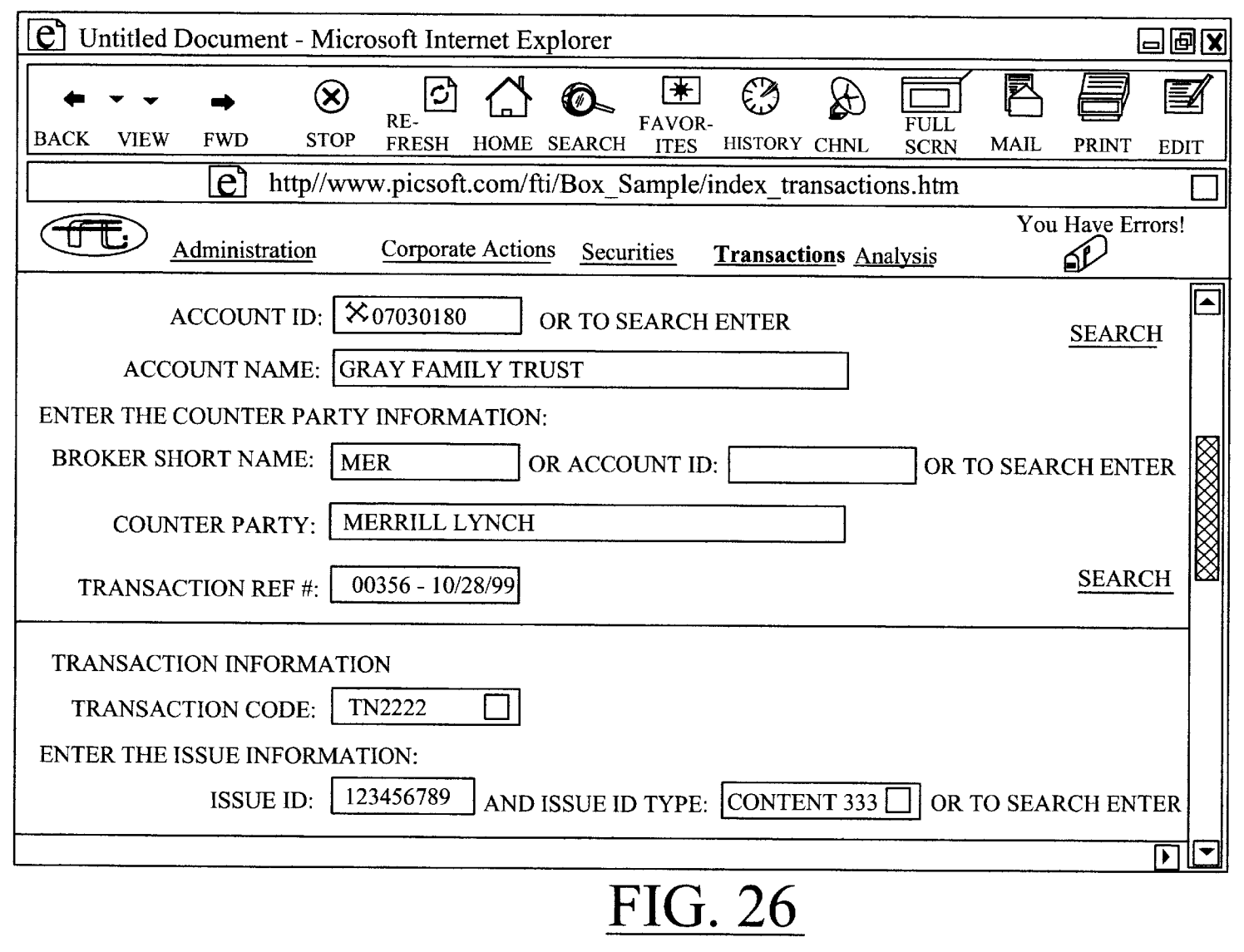

Enter transactions, market data, and customer/counterparty data for virtually any financial transaction, market instrument, customer or counterparty. See FIG. 26.

The UI component of the present invention connects to a highly scalable Web server, 120, on which objects reside which perform the numerous functions that are necessary to the complete the retrieval or update initiated by the UI. The presentation is transmitted to the thin client access device upon which the presentation is rendered by the browser. The contents of the presentation are prepared by the Web server, in turn relying on the substantial data processing support of the other components of the current invention.

This structure preserves the independence of the browser from the processing code, thereby enabling the addition of more processing capabilities to the web server without burdening the user's access device with additional code. Thus, the user need only maintain its browser (a.k.a. "thin client"), 140 FIG. 4, independent of concerns regarding changes and additions to the underlying financial processing logic.

Web Server objects update and retrieve from the database; construct and place messages on the Message Bus that are addressed to the Controller, 105 FIG. 4; perform select financial calculations and data manipulation, and retains results of these calculations and data manipulation in persistent object cache; manage and load balance a pool of connections with the database; route alerts to the designated user; enforce access security; and the like. The Web Server also contains application functionality related to the Accounting Information Server, Market Data Information Server, and Customer/Counterparty Information Server. This application functionality helps to distribute the workload as well as "filtering" processing from the generic to the specific. For example, "financial instrument model" objects are used by the Web Server to reduce the data fields presented on the user's screen to only those needed for the specific type of financial instrument that is then being entered, retrieved, or updated (e.g., for a bond or loan, display the interest rate field; but do not show the interest rate field for a stock). Similarly, model objects exist for filtering the fields that are displayed when working with different types of customers (e.g., retail brokerage vs. corporate lending vs. trust vs. capital markets). Model objects can be executed either by the web Server or the appropriate Information Server. The Web server also allows the user to add proprietary application functionality to its application functionality.

The Web server operates on either an NT or UNIX computer, and operates in conjunction with the Search Engine, 170 FIG. 4, Times Series Engine, 180, Reporting Engine, 190, and Distribution Server, 195, to enable on-line use of the features and functions residing in these components, and on-line viewing of the data and information that is published or otherwise produced by these components. As a result, via the UI the user can enter the following types of retrieval requests, in addition to those described above:

Invoke the Search Engine, 170, against the database. This engine enables the user to enter and conduct free-form searches, such as are common on Internet sites such as Yahoo and HotBot, against the contents of the present invention's database. An example would be a search for all "New York municipal bonds that pay more than 3% interest and mature in less than three years." The search engine that is deployed by and integrated into the invention is supplied by a third party software company.

Invoke the Time Series Engine, 180, against the database. This engine enables the user to enter historical queries and reports as of a specific data and time or across a historical period. An example would be a query requesting the consolidation of settled and pending positions, balances, and transactions from multiple accounts for the same customer, counterparty, or trader as of December 31 of the previous three years. The time series engine deployed by and integrated into the invention is supplied by a third party software company.

Browse through pre-formatted reports and financial statements, 147 FIG. 4 and FIGS. 27 and 28, that were generated by the reporting server, on-line. The Reporting Engine, 190, produces traditional and consolidated customer statements, operations reports, regulatory reports, and the like, at pre-defined intervals (daily, weekly, monthly, quarterly, annually), and distributes them both electronically and via mail to designated recipients. The web-server allows the on-line viewing of these reports and statements, including searches for lines with specific content within the report itself (e.g., search the report of monthly transactions for lines which display transactions in a specific financial instrument or with a specific counterparty). The reporting server deployed by and integrated into the invention is supplied by a third party software company.

The Web Server also allows the integration of third-party software tools and Internet sites, and real-time electronic information services. As a result, via the UI the user can enter the following types of retrieval requests, in addition to those described above, without exiting the UI of the current invention:

Invoke third-party query, reporting, OLAP tools and the like to formulate ad hoc queries and reports against database.

Continuously display transmissions from electronic news services and real-time pricing services (e.g., real-time ticker), search Internet sites that offer investment research, financial calculators, and the like, using data (e.g., instrument id's, financial amounts, etc.) that are extracted from the database.

The current invention also includes a System Administration application, 142 FIG. 4, which also employs the UI and Web browser. This application is used to load balance the workflow, backup and recover components, and the like. Like the other UI applications described above, the System Administration application separates the presentation on the UI from the processing logic on the Web server. See FIG. 29.

Although the invention has been described in detail for the purpose of illustration, it is to be understood that such detail is solely for that purpose and that variations can be made therein by those skilled in the art without departing from the spirit and scope of the invention.

What is claimed is:

1. A computer-executable method of processing financial information substantially in real time, the method including the steps of:
   (a) receiving incoming stochastic data records from any of a plurality of disparate systems relating to any of: (i) financial transactions, (ii) financial instruments, (iii) financial institutions, (iv) customers, and (v) financial transaction counterparties;
   (b) converting the incoming stochastic data records into a common data format substantially in real time;
   (c) consolidating the converted stochastic data records by storing the data records on a consolidated database in conformance with a predefined industry standard;
   (d) receiving data inquiries from at least one of: (i) customers, (ii) financial institution representatives, and (iii) financial transaction counterparites, requesting information from the consolidated database; and (e) in response to the received data inquiry, providing real time access to the requested information from the consolidated database;

wherein the consolidated database is coupled to a controller for controlling database access from any of a plurality of computer servers;

wherein the controller is coupled to a plurality of computer serves including:

(i) an accounting information server for processing messages that contain transactions, and for deriving positions, lots and balances on a trade date and settlement date accrual accounting basis;

(ii) a market data information server that process messages that contain data records from any of a plurality of disparate market data sources; and wherein the controller is coupled to:

(i) a calculation server for performing financial calculations including gain/loss and financial valuations;

(ii) an alert notification server that alerts users when a financial threshold specifying at least one of a credit limit and a trading limit has been crossed;

(iii) a data distribution server for electronically distributing data to users on a recurring and/or periodic basis; and (iv) a search engine server for providing free-form seraches against information stored in the consolidated database.

* * * * *